United States Patent
Iorio et al.

(10) Patent No.: US 10,819,245 B1
(45) Date of Patent: Oct. 27, 2020

(54) CONTROL METHOD AND SYSTEM FOR PREVENTION OF CURRENT INVERSION IN RECTIFIERS OF SWITCHING CONVERTERS

(71) Applicant: STMicroelectronics S.r.l., Agrate Brianza (IT)

(72) Inventors: Alberto Iorio, Aosta (IT); Emilio Volpi, Charvensod (IT); Jeanpierre Vicquery, Brusson (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 16/387,142

(22) Filed: Apr. 17, 2019

(51) Int. Cl.
    *H02M 3/335* (2006.01)
    *H02M 1/088* (2006.01)

(52) U.S. Cl.
    CPC ....... *H02M 3/33592* (2013.01); *H02M 1/088* (2013.01)

(58) Field of Classification Search
    CPC ........ H02M 1/08; H02M 1/088; H02M 1/096; H02M 3/33569; H02M 3/33592
    See application file for complete search history.

(56) References Cited

U.S. PATENT DOCUMENTS

| | | | | |
|---|---|---|---|---|
| 6,438,009 B2 * | 8/2002 | Assow | ............ | H02M 3/33592 363/127 |
| 8,134,851 B2 * | 3/2012 | Soldano | ............ | H02M 3/33592 363/127 |
| 8,699,243 B2 * | 4/2014 | Sims | ................. | H02M 3/33592 363/21.14 |
| 9,257,911 B2 * | 2/2016 | Sakurai | ............ | H02M 3/33507 |
| 9,356,535 B2 | 5/2016 | Iorio et al. | | |
| 2009/0016083 A1 | 1/2009 | Soldano et al. | | |
| 2009/0175056 A1 | 7/2009 | Choi | | |
| 2010/0244941 A1 | 9/2010 | Stuler et al. | | |
| 2010/0290256 A1 | 11/2010 | Zhou et al. | | |
| 2011/0090725 A1 | 4/2011 | Lu | | |

(Continued)

FOREIGN PATENT DOCUMENTS

| | | |
|---|---|---|
| CN | 101997438 B | 7/2014 |
| CN | 105529939 A | 4/2016 |

OTHER PUBLICATIONS

Everts et al., "Optimal ZVS Modulation of Single-Phase Single-Stage Bidirectional DAB AC-DC Converters," *IEEE Transactions on Power Electronics* 29(8):3954-3970, Aug. 2014.

(Continued)

*Primary Examiner* — Matthew V Nguyen
(74) *Attorney, Agent, or Firm* — Seed Intellectual Property Law Group LLP

(57) ABSTRACT

A method of controlling synchronous rectification transistors in a switching converter includes sensing a drain-to-source voltage across each synchronous rectification transistor each switching half-cycle of the switching converter. An average of the sensed drain-to-source voltage is calculated for each synchronous rectification transistor over N prior switching half-cycles. A load current transient in the switching converter is sensed based on the sensed drain-to-source voltage of each synchronous rectification transistor and the calculated average of the sensed drain-to-source voltage for each synchronous rectification transistor over the N prior switching half-cycles.

20 Claims, 16 Drawing Sheets

(56) References Cited

U.S. PATENT DOCUMENTS

| | | |
|---|---|---|
| 2012/0063175 A1 | 3/2012 | Wang et al. |
| 2018/0152111 A1 | 5/2018 | Tschirhart et al. |
| 2018/0301999 A1* | 10/2018 | Moon .............. H02M 3/33592 |
| 2018/0358885 A1* | 12/2018 | Tao ................... H02M 3/33592 |

OTHER PUBLICATIONS

De Simone, "LLC resonant half-bridge converter design guideline" STMicroelectronics, AN2450, Application note, DocID 12784 Rev 6, Mar. 2014, 35 pages.

* cited by examiner

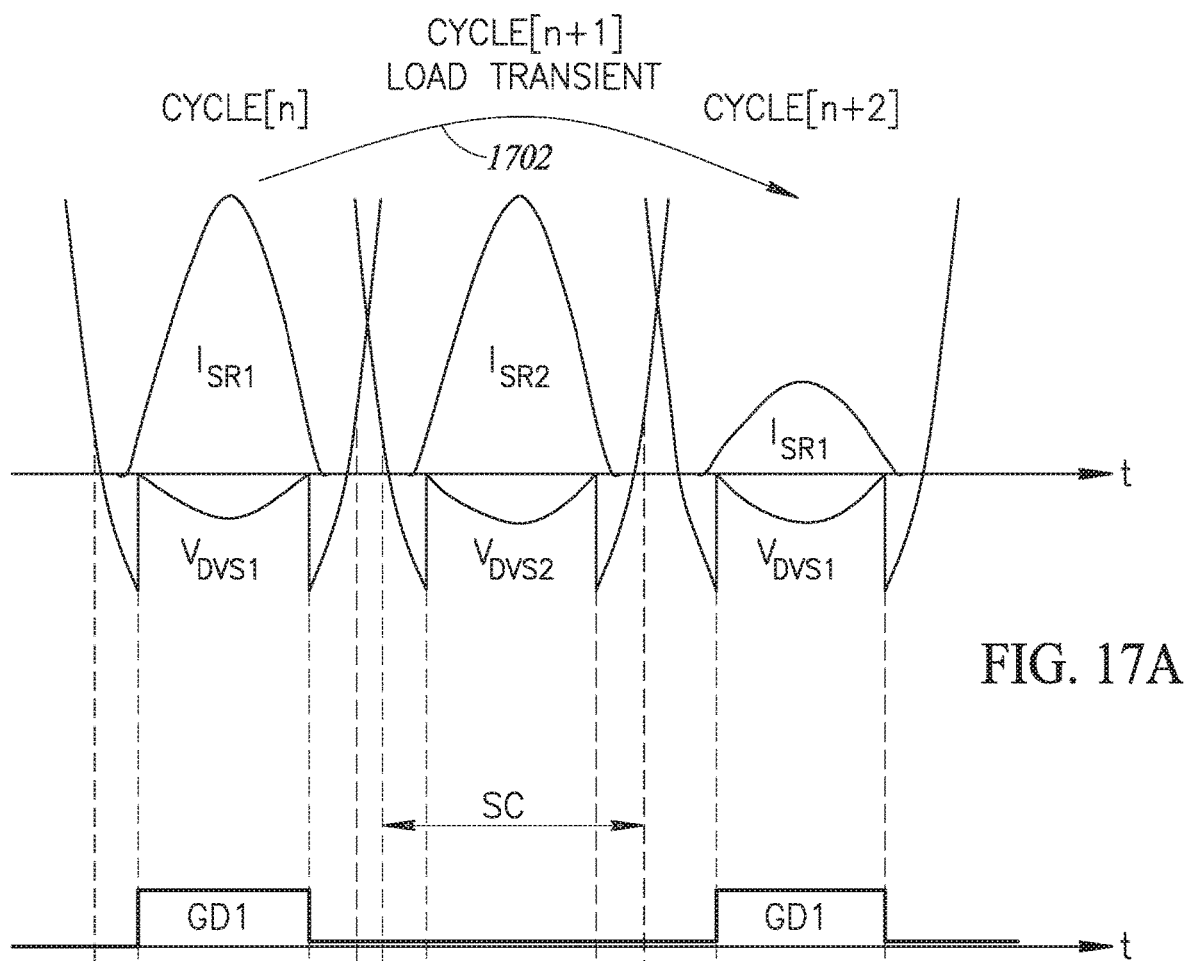
FIG. 17A
FIG. 17B
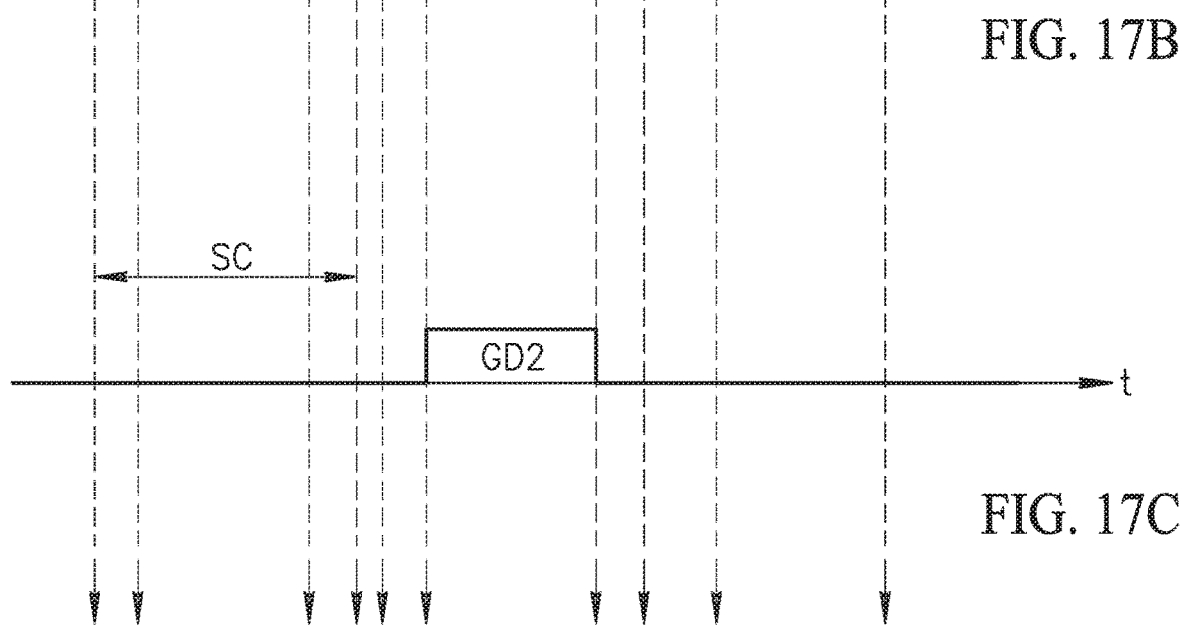
FIG. 17C

CONTROL METHOD AND SYSTEM FOR PREVENTION OF CURRENT INVERSION IN RECTIFIERS OF SWITCHING CONVERTERS

BACKGROUND

Technical Field

The present disclosure relates generally to a control method for a rectifier of a switching converter, and more specifically to the prevention or reduction of current inversion in the synchronous rectifier of a synchronous switching converter.

Description of the Related Art

Resonant converters are a large class of forced switching converters characterized by the presence of a half-bridge or a full-bridge circuit topology. In the half-bridge version, for example, the switching elements comprise a high-side transistor and a low-side transistor connected in series between an input voltage and ground. A square wave having a high value corresponding to the power supply voltage and a low value corresponding to ground may be generated by conveniently switching the two transistors.

The square wave generated by the half-bridge is applied to the primary winding of a transformer by means of a resonant circuit which comprises at least one capacitor and one inductor. The secondary winding of the transformer is connected with a rectifier circuit and a filter to provide an output direct voltage depending on the frequency of the square wave.

At present, one of the resonant converters most widely used is the LLC resonant converter. This name derives from the fact that the resonant circuit employs two inductors (L) and a capacitor (C). A schematic circuit of an LLC resonant converter is shown in FIG. 1 and comprises a half-bridge of MOSFET transistors M1 and M2, with respective body diodes Db1 and Db2, coupled between an input voltage Vin and ground GND and driven by a driver circuit 3. The common terminal between transistors M1 and M2 is connected to a resonant network 2 comprising a series of a first inductance Lr, a second inductance Lm and a capacitor Cr; the inductance Lm is connected in parallel to a transformer 10 comprising a secondary winding connected to a parallel connected capacitor Co and resistance Rout by means of the rectifier diodes D1 and D2. The output voltage Vo of the resonant converter is the voltage across the parallel connected capacitor Co and resistance Rout, while the output or load current Io/Iload flows through the resistance Rout.

These resonant converters are characterized by a high conversion efficiency (>95% is easily achievable), an ability to work at high frequencies, low generation of EMI (electromagnetic interference).

In current types of converter circuits, a high conversion efficiency and high power density are desired, as in the case, for example, of the AC-DC adaptors of notebooks. LLC resonant converters are at present the converters that best meet such desires. The maximum efficiency achievable is limited, however, by losses in the rectifiers on the secondary side of the converter, which account for over 60% of total losses.

To significantly reduce the losses connected to secondary rectification, a "synchronous rectification" technique is used in which rectifier diodes (e.g., D1 and D2 of FIG. 1) are replaced by power MOSFETs. The power MOSFETs have a suitably low on-resistance $R_{dson}$ such that a voltage drop across each MOSFET is significantly lower than the voltage across each rectifier diode D1, D2. These power MOSFETs are driven in such a manner to be functionally equivalent to the rectifier diodes D1, D2. This synchronous rectification technique is widely adopted in traditional converters, especially in flyback and forward converters, for which there also exist commercially available dedicated integrated control circuits. This synchronous rectification technique has also been utilized in resonant converters as well, in particular in LLC converters, in order to improve the efficiency of such converters.

FIG. 2 shows the converter of FIG. 1 except with the rectifier diodes D1, D2 having been replaced with synchronous rectification circuitry. In this case, in the place of the rectifier diodes D1 and D2 there are two synchronous rectifier transistors SR1 and SR2, suitably driven by two signals G1 and G2 generated by a synchronous rectifier driver 80. The transistors SR1, SR2 are referred to as either synchronous rectifier transistors or synchronous rectification transistors in the present description. The transistors SR1, SR2 are connected between the terminals of the center tap of the center-tapped secondary winding and ground GND, while the parallel connected capacitor Co and resistance Rout are disposed between a rectifier output node OUTN coupled to the other terminals of the center-tapped secondary windings and ground GND. From a high-level functional viewpoint there is no difference between the synchronous rectification circuitry of FIG. 2 compared to the rectification circuitry formed by the rectifier diodes D1, D2 in FIG. 1.

The transistors SR1 and SR2 have respective body diodes Dbr1 and Dbr2, and are both driven by the synchronous rectifier driver 80. The output voltage Vo of the resonant converter is the voltage across the parallel connected capacitor Co and resistance Rout, while the output current Io/Iload flows through the resistance Rout. In the present description where more than one of a given component exists, the components are typically referred to using a reference letter followed by a reference number, such transistors SR1, SR2 and body diodes Dbr1, Dbr2. Moreover, when referring to a specific one of these components in the present description, both the reference letter and reference number will be utilized (e.g., SR1, SR2), while the reference letter alone will be utilized when referring to all or any one of the components (e.g., SR and Dbr).

In operation, the transistors SR1 and SR2 are driven in such a manner to be alternatively turned-on at a certain frequency by the synchronous rectifier driver 80. When the body diode Dbr1, Dbr2 of one of the transistors SR1, SR2 starts conducting the relative transistor is turned-on, while when the current is approaching to zero the transistor is turned OFF. In this way the use of the transistors SR1, SR2 results in a lower voltage drop than does the use of the diodes D1, D2, reducing the power dissipation of the rectification circuitry.

Particularly, as shown in FIG. 3, three phases of operation are shown and labelled Phase A, Phase B and Phase C through the letters enclosed in circles in the figure. The Phase A is activated when a drain-to-source voltage Vdvs between the drain and source terminals of one of the transistors SR1, SR2, for example transistor SR1, is lower than a threshold voltage VTH1 and the relative body diode Dbr1 starts conducting. When the voltage Vdvs falls under or below a turn-on threshold voltage $V_{TH\_ON}$, after a fixed delay time period $T_{PD\_ON}$, assuming the voltage Vdvs is maintained under the turn-on threshold voltage $V_{TH\_ON}$, the transistor SR1 is turned ON by the synchronous rectifier driver 80.

After the turn ON of the transistor SR1, operation in Phase B begins and the voltage Vdvs has a value of Vdvs=Rdson×Isr, wherein RA is the ON resistance of the transistor SR1, SR2 and Isr is the synchronous rectifier current flowing through the electric path between the center-tap CT of the secondary winding of the transformer and ground GND. This ON resistance may be alternately referred to as $R_{dson}$ and $R_{DS(on)}$ in the present description (i.e., $R_{dson}=R_{DS(on)}$).

When the voltage Vdvs has a value higher than a second threshold voltage $V_{TH-OFF}$, indicating the current Isr through the transistor is approaching zero, operation in Phase C begins and the transistor SR1 is turned OFF by the synchronous rectifier driver 80. The respective body diode Dbr1 then conducts again and the voltage Vdvs across transistor SR1 goes further negative as illustrated in FIG. 3. The voltage Vdvs goes further negative in response to transistor SR1 turning OFF because positive ISR1 is still flowing but now flows through body diode Dbr1 and there is a larger voltage drop across this body diode than the voltage drop (Rdson×Isr) across the source and drain when the transistor is turned ON. The voltage Vdvs then varies as shown in FIG. 3 and begins increasing, and when the voltage Vdvs reaches the threshold VTH2, Phase C ends. As soon as the voltage Vdvs reaches the threshold voltage $V_{TH\_ON}$, the synchronous rectifier driver 80 turns ON the transistor SR2, and operation in Phases A, B and C as just described for transistor SR1 occurs for transistor SR2.

The actual voltage Vdvs depends on parasitic elements of the source and drain terminals of the transistor SR1, SR2 and of a conductive trace or path on a printed circuit board (PCB) from the drain terminal of the transistor SR1, SR2 to the terminal of the corresponding secondary winding of the transformer 10. Particularly, the voltage Vdvs depends on the parasitic inductances Lsource and Ldrain associated with the source and drain terminals of the transistor SR1, SR2 and on the parasitic inductance Ltrace of the conductive path of printed circuit board (PCB) from drain terminal of the transistor SR1, SR2 to the corresponding terminal of the secondary winding of the transformer 10. Therefore, due to these parasitic inductances, the actual drain-to-source voltage $$Vdvs(t) = -Rdson \times Isr - (Ldrain + Lsource + Ltrace) \times \frac{\partial Isr}{\partial t}$$

for each of the transistors SR1, SR2. Thus, this parasitic or stray inductance Lstray or $L_{SR}$ ($L_{SR}$=Lsource+Ldrain+Ltrace) makes the actual sensed voltage Vdvs1, Vdvs2 across each transistor SR1, SR2 different from the ideal voltage drop value on across the resistance $R_{dson}$ presented by the transistor, where this voltage is designated Vdvs-ideal in the following description.

The presence of this parasitic inductance $L_{SR}$ results in an undesired earlier turn OFF of the transistors SR1, SR2 as shown in FIG. 4 where the actual drain-source voltage Vdvs taking into account the stray inductance $L_{SR}$ and the desired drain-source voltage Vdvs-ideal are shown. This results in a residual conduction time $T_{diode}$ of the body diode Dbr1 or Dbr2 increasing, causing a loss of efficiency indicated as a time LE in FIG. 4 and which is due to the higher voltage drop across the body diode Dbr1 or Dbr2 for the longer duration during the time LE. The transistor SR1 turns OFF at a time t1 instead of turning OFF at a time t2, where (t2−t1)=LE, resulting in this undesired increase in the residual conduction time $T_{diode}$ of the body diode Dbr1. For example, a typical actual residual conduction time $T_{diode}$ of the body diode Dbr1, Dbr2 could be on the order of 1 microsecond, while a typical desired residual conduction time $T_{diode}$ is approximately 60 nanoseconds.

There are known techniques to avoid the earlier turn OFF of the transistors SR1, SR2 to improve the efficiency of converter. One approach is to compensate the time delay due to the parasitic inductance $L_{SR}$ by adding an RC filter between the synchronous rectifier driver 80 and transistor SR1, SR2, and before the transformer 10 as shown in FIG. 5. This RC filter approach of compensating for the parasitic inductance $L_{SR}$ provides a simple architecture with a consequent low cost in terms of silicon area and good performance. Furthermore, the efficiency of this solution is dependent on the residual conduction time $T_{diode}$ of the body diodes Dbr1, Dbr2 which, in turn, depends on the ON resistances of the transistors SR1, SR2, on the parasitic elements of the transistors (Lsource, Ldrain) and the printed circuit board (Ltrace) to which the transistors are connected, on temperature, and on the slew rate of the current flowing through the transistor.

Another approach that has been utilized to compensate for the parasitic inductance LSR is referred to as an adaptive turn-off control algorithm. In this approach, the idea is to take advantage of the anticipatory effect or leading nature of the actual measured or sensed drain-source voltage Vdvs caused by the parasitic inductance LSR relative to the ideal drain-source voltage. This is seen in FIG. 5 with the actual sensed $$Vdvs(t) = -Rdson \times Isr - (Ldrain + Lsource + Ltrace) \times \frac{\partial Isr}{\partial t}$$

where LSR=(Ldrain+Lsource+Ltrace) as defined above. The effect of the parasitic inductance LSR is that the actual sensed voltage Vdvs, as illustrated in FIG. 4, does not correspond to the ideal drain-source voltage Vdvs-ideal of the transistor SR. This actual sensed voltage Vdvs leads or anticipates the ideal drain-source voltage Vdvs-ideal, meaning a zero crossing of the actual sensed voltage occurs earlier in time than the actual zero crossing of the ideal drain-source voltage. The adaptive turn-off control algorithm utilizes the actual voltage Vdvs and detects a zero-crossing of this signal, and measures the residual body diode Dbr conduction time for the transistor SR. The algorithm then, cycle-by-cycle, increases a programmable turn-off delay relative to the detected zero-crossing to minimize the residual conduction time Tdiode of the body diode Dbr and thereby reduce the resulting power losses in the diode, improving the efficiency of the converter. The adaptive turn-off control algorithm is described in more detail in U.S. Pat. No. 9,356,535, which is incorporated herein in its entirety to the extent not inconsistent with the specific teachings and definitions set forth herein. Whether being controlled through the adaptive turn-off control algorithm or other type of control algorithm, however, there is need for improved control of synchronous rectification switches in synchronous resonant switching converters.

BRIEF SUMMARY

One aspect of the present disclosure is a control device for a rectifier of a switching converter which avoids a reversal of a current or "current inversion" through synchronous rectifier transistors of the rectifier when the resonant converter experiences a transient in the load current being supplied by the resonant converter.

BRIEF DESCRIPTION OF THE SEVERAL VIEWS OF THE DRAWINGS

For a better understanding of the present disclosure, a preferred embodiment thereof is now described, purely by way of non-limiting example and with reference to the annexed drawings, wherein:

FIGS. 17A-17F are signal timing and functional diagrams illustrating a current inversion prevention control algorithm for controlling operation of the rectifier of the switching converter of FIG. 6 to prevent current inversion even in the presence of load current transients according to one embodiment of the present disclosure;

DETAILED DESCRIPTION

Embodiments of the present disclosure are directed to a current inversion prevention control algorithm for a rectifier of a resonant converter, such as an LLC resonant converter, which avoids a reversal of a current or "current inversion" through synchronous rectifier transistors of the resonant converter when the resonant converter experiences a high-to-low transient in a load current, as will be described in more detail below. Embodiments of the present disclosure may be utilized with the adaptive turn-off control algorithm, but may also be utilized with other methods of controlling the synchronous rectifier transistors of a resonant converter. These embodiments utilize the actual drain-source voltage $V_{dvs}(t)$ across each synchronous rectifier transistor SR taking into account the associated stray inductance $L_{SR}$, as discussed above, with this actual voltage $V_{dvs}(t)$ being compared to a threshold that is calculated cycle-by-cycle and is based on sensed values of the voltage $V_{dvs}(t)$ over the previous N-cycles, as will be described in more detail below. This approach compensates for variations in the value of the actual drain-source voltage $V_{dvs}(t)$ as a function of the switching frequency $\omega_{sw}$ of the switching converter. Recall, the drain-source voltage $V_{dvs}(t) = (R_{dson} \times I_{sr} - L_{SR} \times \partial I_{sr}/\partial t)$ and thus the component $$\left(L_{SR} \times \frac{\partial I_{sr}}{\partial t}\right)$$

of the drain-source voltage $V_{dvs}(t)$ caused by the stray inductance $L_{SR}$ varies as a function of the switching frequency $\omega_{sw}$, which, in turn, causes the value of the drain-source voltage $V_{dvs}(t)$ to be a function of the switching frequency, as will be described in more detail below. In the equations contained herein, the stray inductance $L_{SR}$ may be indicated as LSR.

As mentioned above, embodiments of the present disclosure are not limited to being utilized with the adaptive turn-off control algorithm. In the present disclosure, however, the described embodiments will be described in conjunction with the adaptive turn-off control algorithm to provide a better understanding and example implementation of embodiments of the present disclosure. Accordingly, a brief description of the adaptive turn-off control algorithm will first be provided before discussing embodiments of the present disclosure in more detail. The adaptive turn-off control algorithm is described in detail in U.S. Pat. No. 9,356,535 as mentioned above, with this patent being incorporated herein in its entirety to the extent not inconsistent with the specific teachings and definitions set forth herein.

Figure 6:
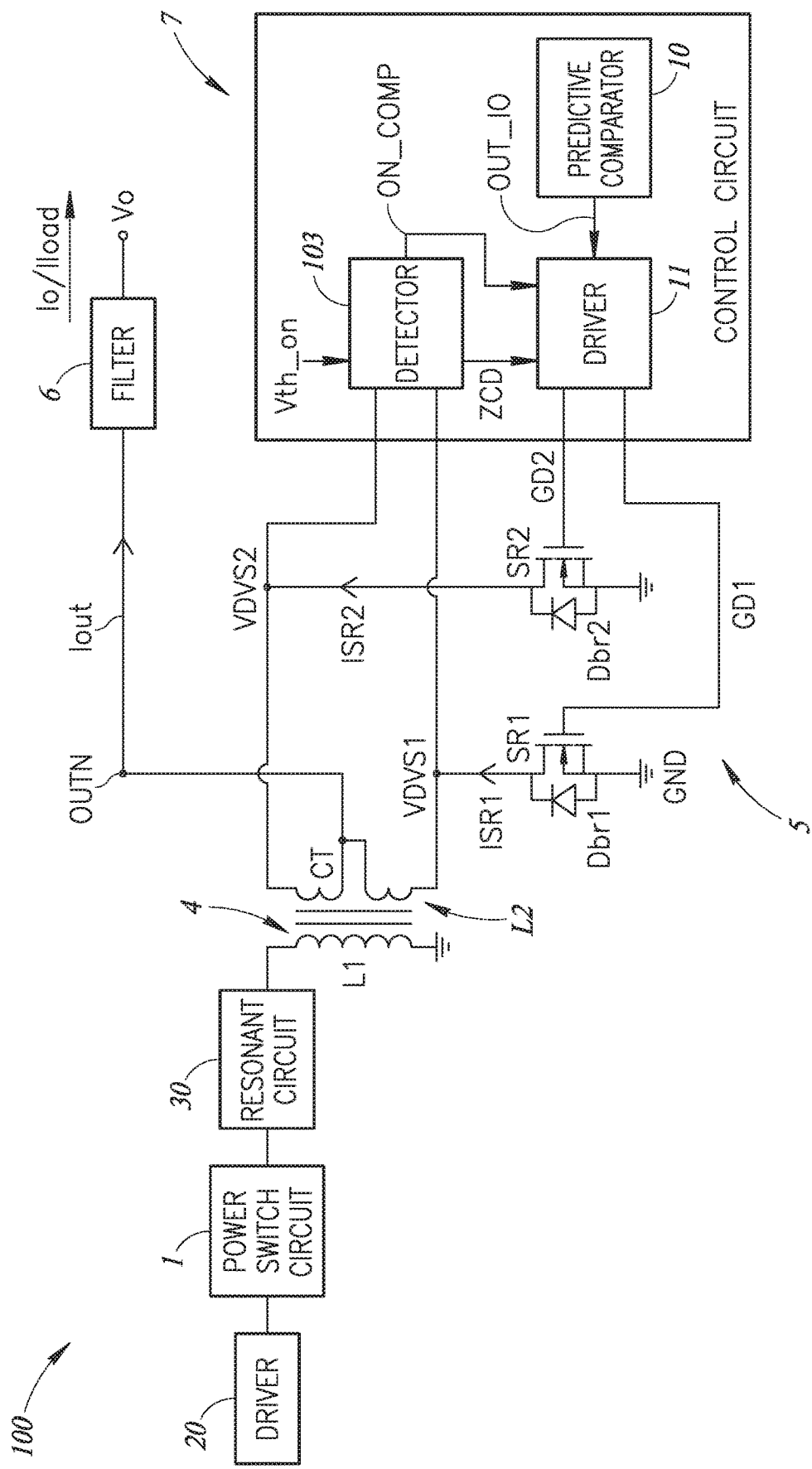
FIG. 6 is a block diagram of a switching converter comprising a control device for a rectifier of a switching converter according to a preferred embodiment of the present disclosure.

Referring to FIG. 6, a control circuit 7 for a rectifier 5 of a switching converter 100 is shown according to an embodiment of the present disclosure. The switching converter 100 includes power switching circuitry including a power switching circuit block 1, powered by a DC voltage and configured to generate a square wave with a certain frequency under control of a first driver 20. For example, the power switching circuit block 1 could have a half-bridge or a full-bridge circuit topology (typically of MOSFET transistors) but other power switching circuit blocks could be equally adopted. The power switching circuitry of the switching converter 100 further includes an impedance 30 connected to a primary winding of a transformer 4, with the converter being adapted to provide an output or load current Io/Iload to a load (not shown in FIG. 6). In the embodiment of FIG. 6, the switching converter 100 is an LLC resonant converter and the impedance 30 is a resonant circuit. Although the control circuit 7 will be described herein an executing the current inversion prevention control algorithm in combination with an adaptive turn-off control algorithm to control turn OFF of synchronous rectification transistors SR1, SR2, the control circuit may also implement other turn OFF control methods in combination with the current inversion prevention control algorithm to control turn OFF of the transistors SR1, SR2.

The square wave generated by the power switching circuit block 1 is applied to the resonant circuit 30 tuned to a fundamental frequency of the square wave. In this manner, because of the selective frequency characteristics of the resonant circuit 30, the resonant circuit responds principally to this fundamental frequency component and to a negligible degree to higher-order harmonics. It follows that the circulating power can be modulated by varying the frequency of the square wave, while maintaining the duty cycle constant at 50%, and that, according to the configuration of the resonant circuit 30, the currents and/or voltages associated with the power flow will have a pattern that is sinusoidal or sinusoidal at intervals.

Figure 1:
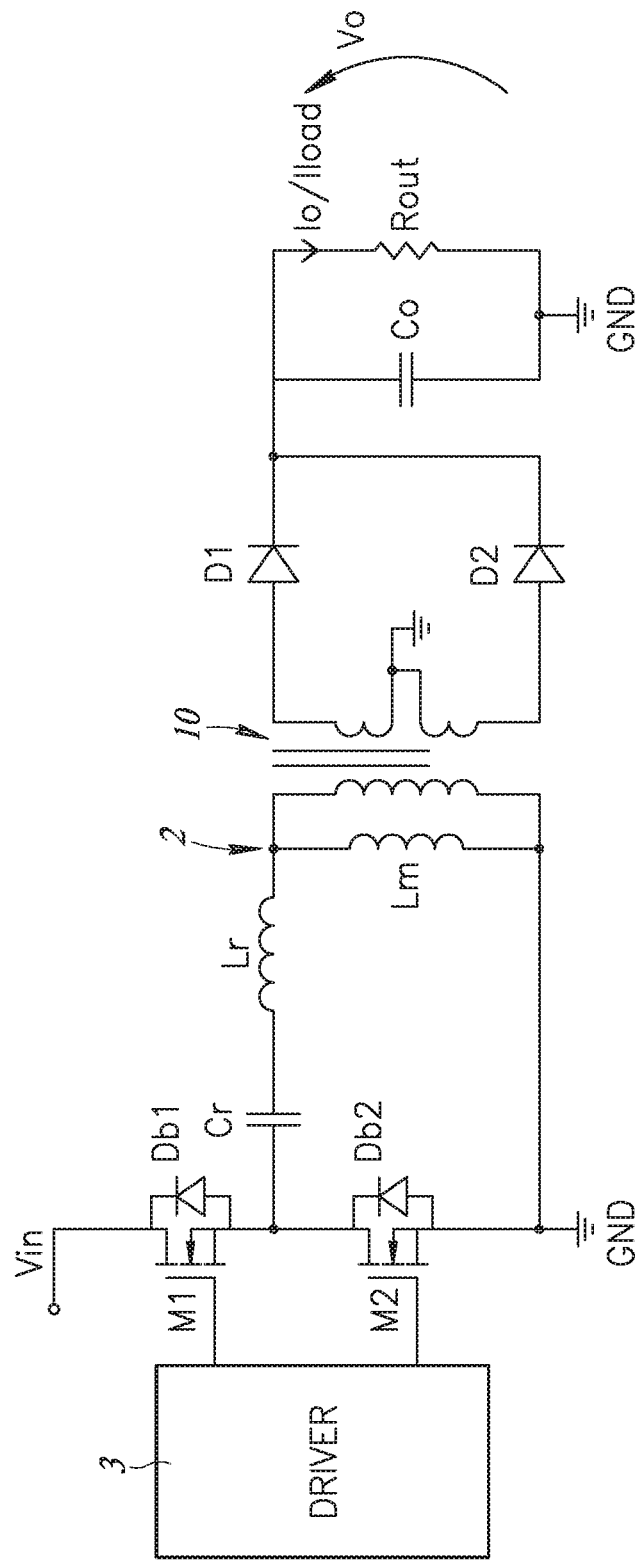
FIG. 1 is a diagram of an LLC-type resonant converter with a center-tapped secondary winding and rectification of the output current by means of diodes according to prior art.

The resonant circuit 30 is coupled to a transformer 4 including a primary winding L1 and center-tapped secondary windings L2. A rectifier 5 comprising at least a transistor SR1, SR2 is coupled to the center-tapped secondary winding L2 of the transformer 4. Preferably, the rectifier 5 comprises a pair of transistors SR1 and SR2 which have drain terminals connected with respective terminals of two portions of the center-tapped secondary winding L2 and source terminals connected with ground reference GND. The center-tap CT of the secondary winding L2 is then connected to a filter 6 which provides the output or load current Io/Iload and output voltage Vo to a load (not shown) coupled to the filter. The filter 6 could be a common parallel connection of a capacitor and a resistance. The two transistors SR1, SR2 are preferably MOSFET transistors with respective body diodes Dbr1, Dbr2 and a suitably low on-resistance Ron, such that the drain-source voltage drop across each transistor is significantly lower than the voltage drop across a diode, like in the prior art rectifier configuration shown in FIG. 1.

A control circuit 7 controls the rectifier 5, synchronously driving the transistors SR1 and SR2 by means of two control signals GD1 and GD2, applied to the control terminals of the transistors SR1 and SR2, respectively, to control switching of the transistors SR1 and SR2. The control circuit 7 receives as inputs the drain-source voltages Vdvs1 and Vdvs2 of the transistors SR1, SR2, and generates the two control signals GD1, GD2 for the transistors SR1, SR2 based on the drain-source voltages Vdvs1, Vdvs2. The currents ISR1, ISR2 are defined as being positive in the directions shown in FIG. 6, namely flowing to output node OUTN of the converter 100. A set of further signals and other temporal parameters which are used by control circuit 7 are described below.

The control circuit 7 includes a driving circuit 11 which provides the control signals GD1, GD2 to the transistors SR1, SR2 and preferably includes a predictive comparator circuit 10. The driving circuit 11 receives the output signals of a detecting circuit 103 receiving the drain-source voltage Vdvs1 or Vdvs2 of the transistors SR1, SR2.

The detecting circuit 103 is configured to detect when the drain-source voltage Vdvs1, Vdvs2 crosses a voltage threshold Vth_on and to provide an output signal ON COMP responsive to the drain-source voltage Vdvs1, Vdvs1 reaching the Vth_on threshold. The voltage threshold Vth_on has a value that is related to the threshold voltages of the body diodes Dbr1, Dbr2 of the transistors SR1, SR2. In one embodiment, the detecting circuit 103 includes a first comparator circuit configured to provide the output signal ON COMP as an output pulse signal starting in response to the drain-source voltage Vdvs1, Vdvs2 becoming less than the fixed voltage threshold Vth_on and ending in response to the drain-source voltage Vdvs1, Vdvs2 increasing and reaching the same fixed voltage threshold Vth_on. The detecting circuit 103 is also configured to detect a zero-crossing event of the drain-source voltage Vdvs1, Vdvs2 of the transistors SR1, SR2 and to provide an output signal ZCD in response to detecting such a zero-crossing event. To provide the ZCD signal, in one embodiment the detecting circuit 103 includes a second comparator circuit configured to provide an output pulse as the zero-crossing signal ZCD responsive to the drain-source voltage Vdvs1, Vdvs2 crossing the zero voltage level, namely the reference level ground GND in one embodiment.

Figure 7:
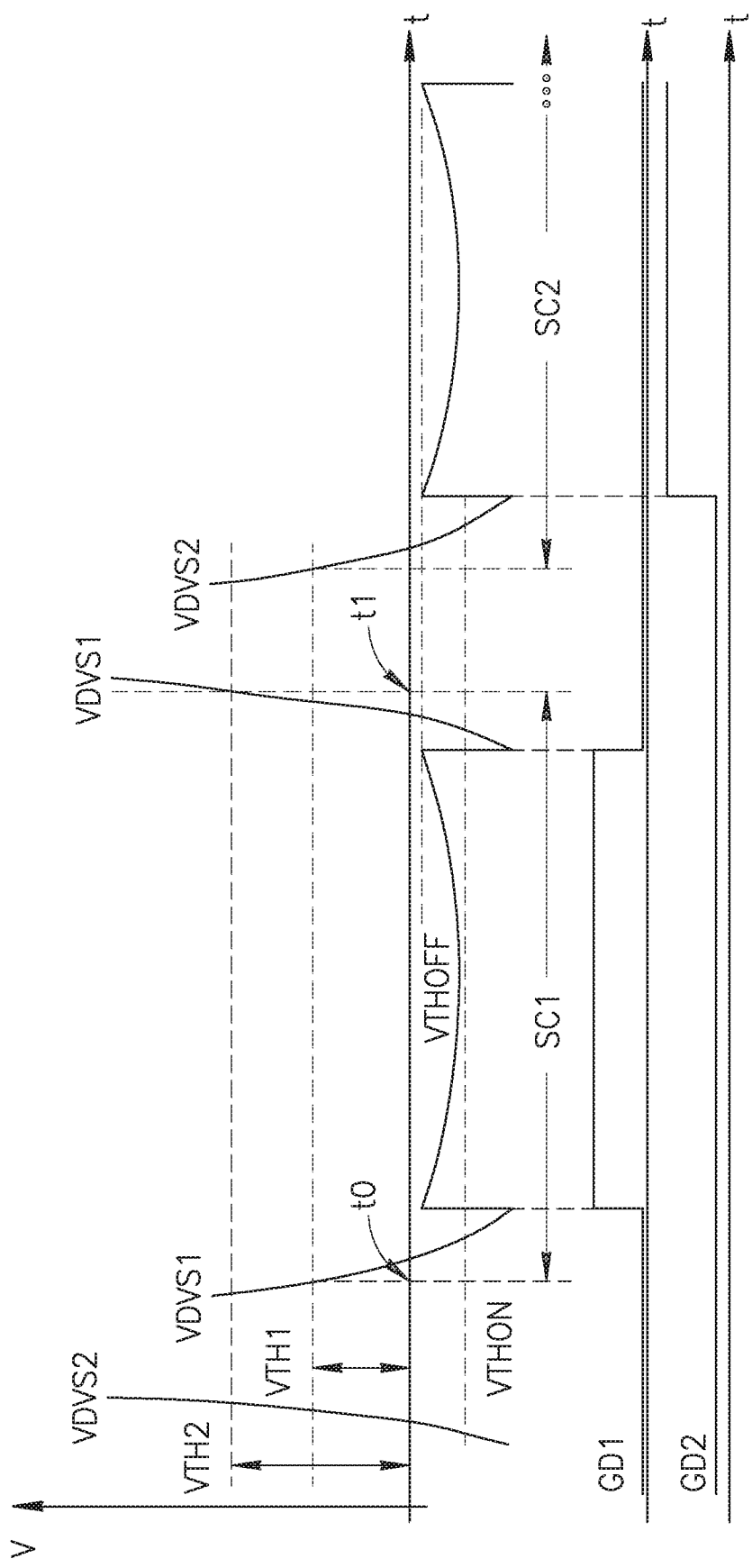
FIG. 7 is a time diagram of the waveforms of the drain-source voltages of the transistors of a synchronous rectifier of prior art.

A switching cycle SW of the switching converter 100 includes two switching half-cycles SC1, SC2. Each switching half-cycle SC1, SC2 of the switching converter 100 involves alternately one of the transistors SR1, SR2, and in particular each half-cycle SC1, SC2 begins when the drain-source voltage Vdvs1, Vdvs2 is equal to a threshold value VTH1 and ends when the drain-source voltage Vdvs1, Vdvs2 reaches a threshold value VTH2, as seen in the signal diagram of FIG. 7. Referring now to FIGS. 6 and 7, the transistor SR1 is operative (i.e., is turned ON) during the first half-cycle SC1 of the switching cycle SW while the transistor SR2 is operative (i.e., turned ON) during the second half-cycle SC2 of the switching cycle SW. The drain-source voltages Vdvs1, Vdvs2 and the currents ISR1, ISR2 of the MOSFET transistors SR1 and SR2 vary over time as shown in FIG. 7 for these voltages and currents, which will be described in more detail below with reference to FIGS. 11 and 12. The current ISR2 has the same relative relationship to the voltage Vdvs2 during half-cycle SC2 as does current ISR1 to voltage Vdvs1 during half-cycle SC1. Each switching cycle SW includes the first and second half-cycles SC1, SC2 of the converter 100, and thus includes alternately turning ON and OFF the transistors SR1, SR2. Therefore, each switching half-cycle SC1, SC2 of the converter 100 involves activating one of the transistors SR1, SR2, and in particular each half-cycle SC1, SC2 begins responsive to the drain-source voltage Vdvs1, Vdvs2 becoming equal to the first threshold value VTH1 and ends responsive to the same drain voltage Vdvs1, Vdvs2 reaching a second threshold value Vth2. For example, in an application with a switching cycle corresponding to a switching frequency of 100 KHz, each of the half-cycles SC1, SC2 is equal to 5 microseconds (i.e., a switching cycle of 10 microseconds).

Figure 4:
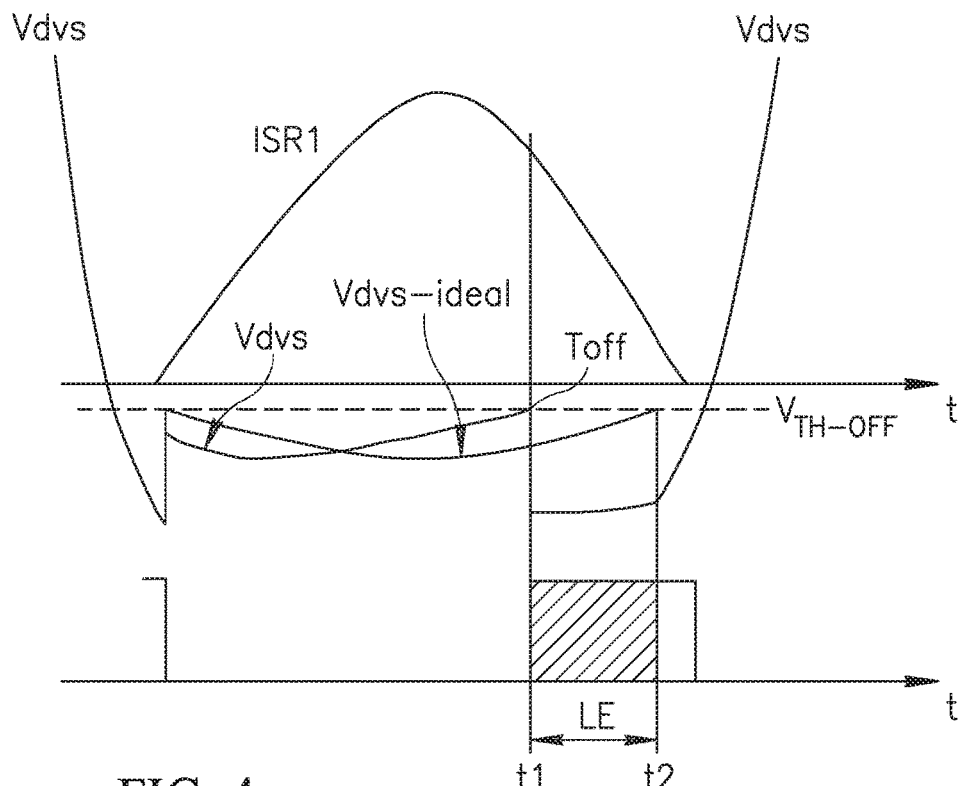
FIG. 4 shows the waveforms of the current flowing through one transistor of the rectifier in FIG. 2 with a premature turning off of the transistor.
Figure 5:
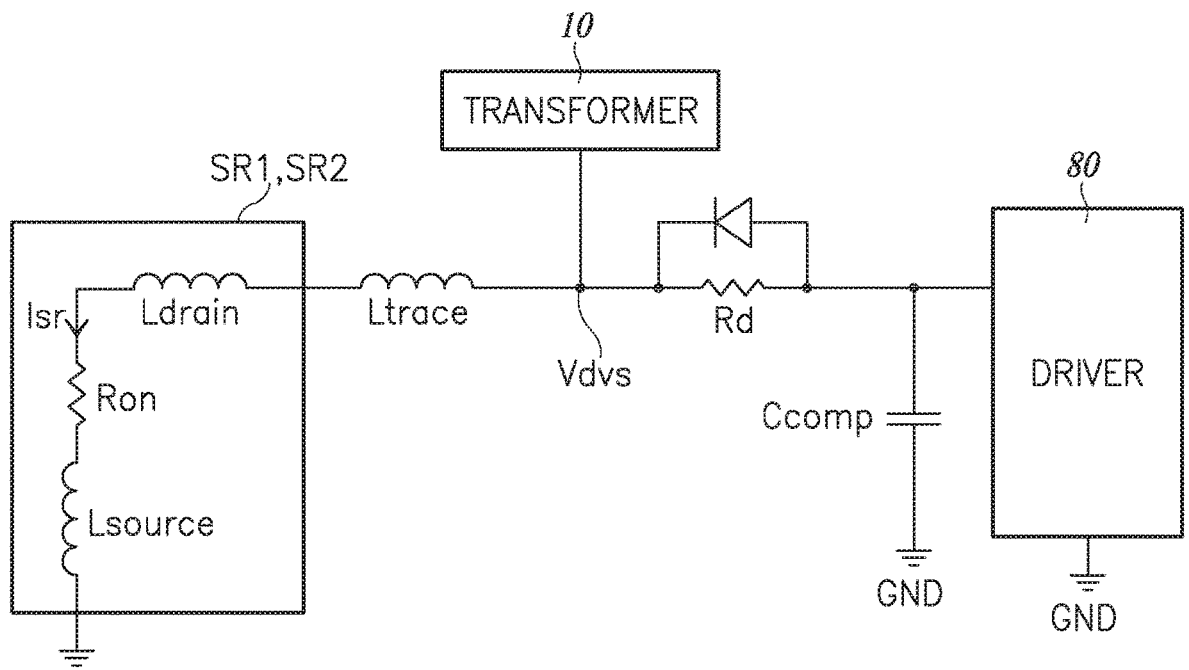
FIG. 5 shows a transistor of the rectifiers of FIG. 2 with the parasitic elements, an RC compensation filter and a bypass diode.

As already above-mentioned, the presence of parasitic inductances Ldrain, Lsource and Ltrace, collectively referred to as stray inductance $L_{SR}$, determines an undesired earlier turn-off $T_{off}$ of the transistors SR1, SR2, which occurs at time t1 as shown in FIG. 4 where the actual drain-source voltage Vdvs (i.e., Vdvs1 or Vdvs2) and the desired or ideal voltage Vdvs-ideal are shown. This increases the residual conduction time $T_{diode}$ of the body diode Dbr1,Dbr2, causing a loss of efficiency, which is indicated as a duration LE in FIG. 4, due to the higher voltage drop across the body diode Dbr1,Dbr2. For example, a typical starting body diode residual conduction time $T_{diode}$ could be on the order of 1 microsecond (i.e., the duration LE), while a typical desired body diode residual conduction time value is on the order of 60 nanoseconds for the ideal drain-source voltage Vdvs-ideal.

In embodiments of the present disclosure, at the start of the switching cycle SW, and particularly at the start of the switching half-cycle SC1, SC2 where the transistor SR1, SR2 is turned ON, as previously discussed with reference to FIG. 6, the control circuit 7 according to a embodiments of the present disclosure is configured to set a new off time instant $T_{off1}$ of the transistor SR1, SR2 at the start switching half-cycle SC1, SC2. The new off time instant $T_{off1}$ is set so that the off time instant immediately precedes a large time interval T1 with respect the time instant of the zero crossing event of the drain-source voltage Vdvs1, as described in more detail in the previously incorporated U.S. Pat. No. 9,356,535. The new off time instant $T_{off1}$ has a fixed value, preferably a percentage of the half-cycle SC1, SC2. This new off time instant $T_{off1}$ is appropriately chosen to take into account the gate drive discharge time of the transistors SR1, SR2 and other additional factors before a complete transistor turn OFF of the transistor SR1, SR2 occurs. A reasonable off time instant $T_{off1}$ could be equal to the 70% of the switching half-cycle SC1, SC2, but other suitable percentages could also be used in order to set the off time instant $T_{off1}$.

While the adaptive turn-off control algorithm, and alternative control algorithms for controlling rectification circuits in synchronous switching converter, provide adequate control of the switching converter in many applications, transients in the load current Iload can result in inadequate control of the converter. Transients in the load current Iload can occur, for example, where a load is connected to or disconnected from the switching converter during operation, such as where the switching converter is part of a power supply for an electronic device such as a laptop computer or smart phone. Large or high load current transients result in variation in the regulated output voltage Vo, which is then compensated for by control circuitry of the switching converter to maintain the desired value of the output voltage Vo. The control circuitry adjusts the switching frequency of the switching converter in response to the transient in the load current Iload and resulting change in output voltage Vo. As the switching frequency is increased or decreased, depending on whether the transient causes an increase or decrease in the load current Iload, the adaptive turn-off control algorithm continues using the last value of the programmable turn-off delay to turn OFF the synchronous rectifier transistors SR.

Figure 2:
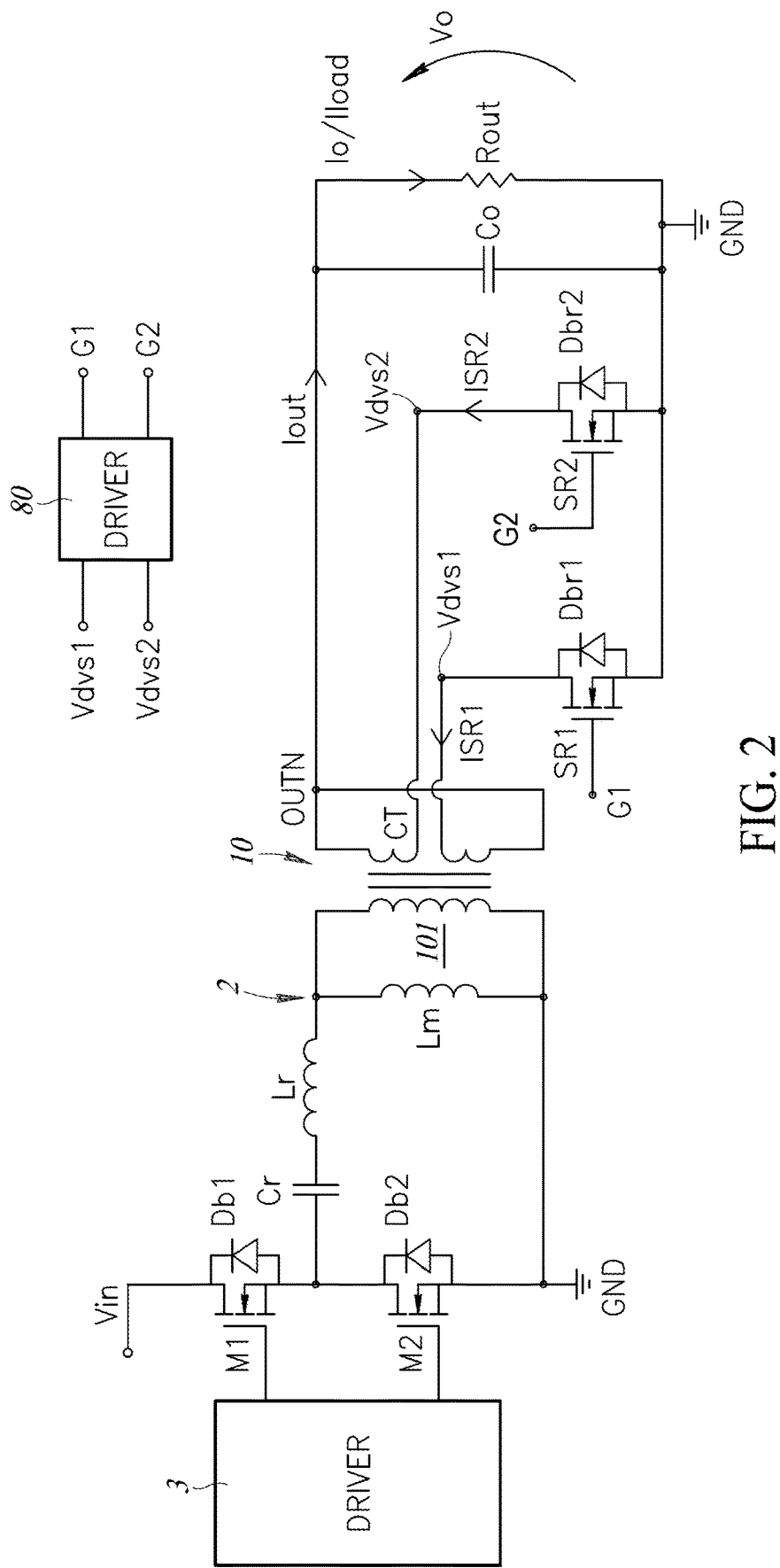
FIG. 2 is a diagram of an LLC-type resonant converter with a center-tapped secondary winding and rectification of the output current by means of synchronous rectifier according to prior art.
Figure 3:
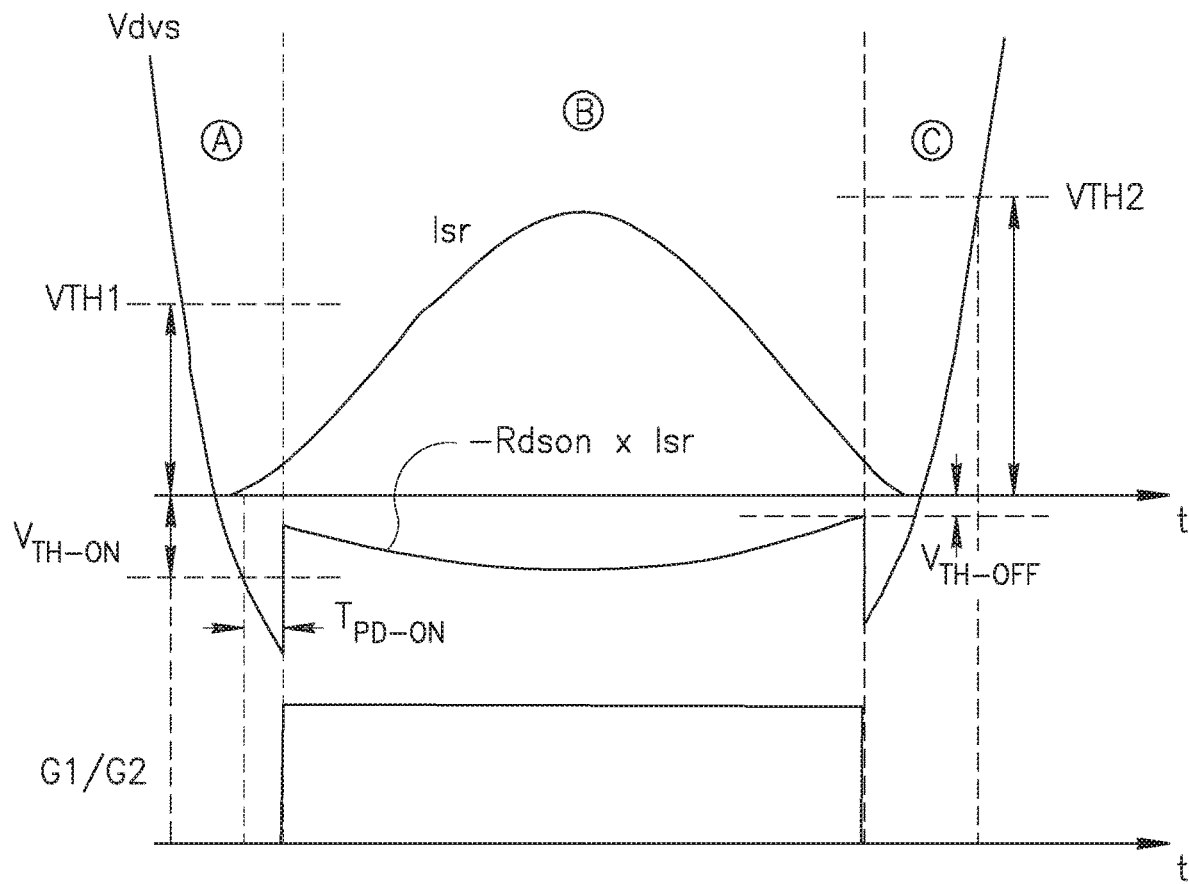
FIG. 3 shows the waveforms of the current flowing through a transistor of the rectifiers of FIG. 2 and of its drain source voltage.

This operation of the adaptive turn-off control algorithm in response to transients in the load current Iload may result in the synchronous rectifier transistors SR being turned OFF after the zero current crossing of the current Isr, which may result in "current inversion" in the switching converter. Current inversion occurs where the synchronous rectifier current Isr through the synchronous rectifier transistors SR reverses direction or "inverts" before the synchronous rectifier controller turns OFF the transistor SR. Current inversion is to be avoided because when the current Isr reverses direction, namely becomes negative, and flows in the direction opposite to the positive direction shown in FIG. 2, this negative current Isr flows from the rectifier output node OUTN to ground GND and thereby discharges the rectifier output node. This discharge of the output node OUTN wastes charge provided to the rectifier output node, reducing the efficiency of the converter. In addition to reducing the efficiency of the switching converter, current inversion may also result in malfunction or failure of the switching converter and should accordingly be avoided for these additional reasons, as will be appreciated by those skilled in the art.

Figure 8:
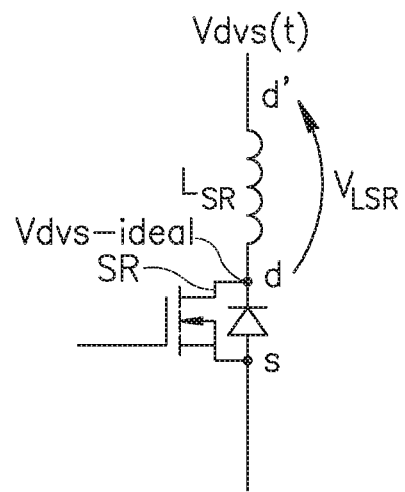
FIG. 8 is a schematic representation of the one of the synchronous rectifier transistors in the rectifier of FIG. 6 including the stray inductance associated with the transistor.
Figure 9:
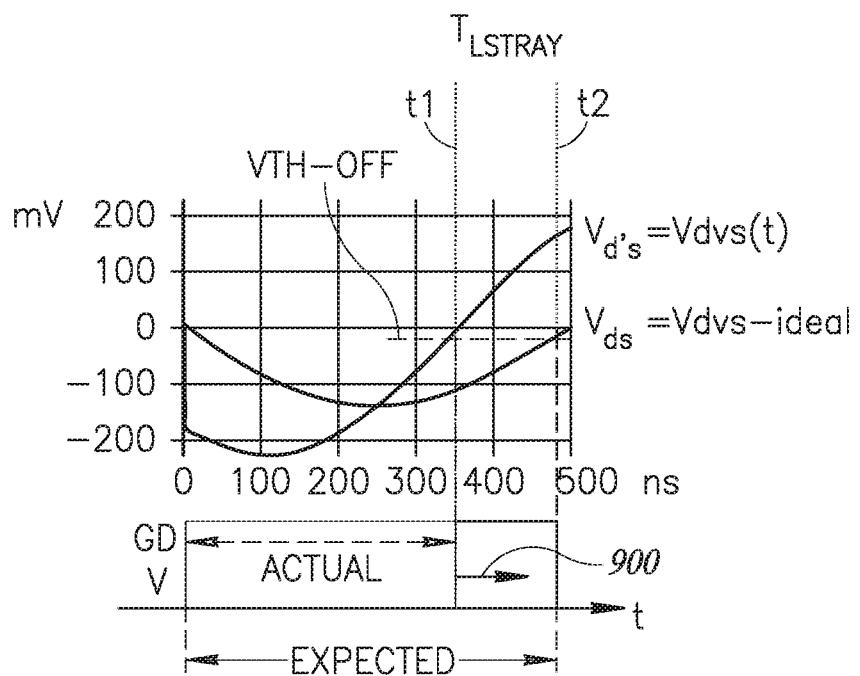
FIG. 9 is signal timing diagram showing effect of the stray inductance on the turn-off time of the synchronous rectifier transistor of FIG. 8.

In operation, the adaptive turn-off control algorithm takes advantage of the anticipation effect of the stray inductance $L_{SR}$, namely the stray inductance Ltrace associated with the printed circuit board (PCB) trace coupled to the transistor SR along with the stray inductances Lsource, Ldrain of the package of the transistor SR, as will now be discussed in more detail with reference to FIGS. 8 and 9. FIG. 8 is a schematic representation of the transistor SR and associated stray inductance $L_{SR}$. The ideal drain-to-source voltage Vdvs-ideal (see FIG. 4) is the voltage at node d in FIG. 8, while the actual voltage drain-to-source voltage Vdvs(t) is the voltage at node d', namely the ideal voltage Vdvs-ideal ($-R_{dson} \times I_{SR}$) plus the voltage across the stray inductance $L_{SR}$ (LSR×∂Isr/∂t). In FIG. 9, the ideal voltage Vdvs-ideal and the actual voltage Vdvs(t) are illustrated. The vertical axis is voltage and the horizontal axis time in FIG. 9. The effect of parasitic inductance $L_{SR}$ is illustrated in FIG. 9. The real or actual voltage Vdvs(t) is anticipated or leads in time with respect to the ideal voltage Vdvs-ideal. This results in the zero-crossing of the actual voltage Vdvs(t) occurring before the zero-crossing of the ideal voltage Vdvs-ideal. In the context of this description, the term "zero-crossing" is used to mean a point indicating the voltage Vdvs-ideal or Vdvs(t) is approaching zero and thus corresponds to threshold $V_{TH-OFF}$ as illustrated by the horizontal dashed line in FIG. 9, and as previously discussed with reference to FIG. 4. This anticipated or leading characteristic of the actual voltage $V_{DVS}(t)$ is exploited in the adaptive turn-off algorithm by means of a zero-crossing comparator (see detector 103 of FIG. 6). In this way, the adaptive turn-off control algorithm functions to turn-off the transistor SR before the current $I_{SR}$ through the transistor reaches a zero value or goes negative (i.e., before current inversion).

In operation, the adaptive turn-off control algorithm in each switching half-cycle SC initially sets an estimated turn OFF time Toff for the corresponding transistor SR that is active during that half-cycle. The residual conduction time $T_{diode}$ of the body diode Dbr of the transistor SR is then measured to determine whether this conduction time is less than a time threshold $T_{th1}$. As long as the residual conduction time $T_{diode}$ of the body diode Dbr is greater than the time threshold $T_{th1}$, the algorithm incrementally increases, cycle-by-cycle, a programmable delay PD of the turn OFF time Toff of the transistor SR and again measures the conduction time $T_{diode}$ of the body diode Dbr of the transistor. As the programmable delay PD is incrementally increased, the zero-crossing of the actual voltage Vdvs(t) signal in FIG. 9 moves from the time t1 towards the time t2, which corresponds to the zero-crossing of the ideal voltage Vdvs-ideal.

This movement of the zero-crossing point of the actual voltage Vdvs(t) as the programmable delay PD is incrementally increased is illustrated through the arrow 900 in FIG. 9. The adaptive turn-off control algorithm thus incrementally increases the programmable delay PD of the turn OFF time Toff for the transistor SR until the measured conduction time $T_{diode}$ of the body diode Dbr of the transistor is approximately equal to the conduction time $T_{diode-Ideal}$ of the body diode Dbr for the ideal voltage Vdvs-ideal. Thus, the time threshold $T_{th1}$ corresponds to the conduction time $T_{diode-ideal}$, with the programmable delay PD being incrementally adjusted to delay the turn OFF of the transistor SR until the actual conduction time $T_{diode}$ is approximately equal to the ideal conduction time $T_{diode-ideal}$, which corresponds to the zero-crossing of the actual voltage Vdvs(t) occurring at the time t2 in FIG. 9. In this way, the adaptive turn-off control algorithm adjusts the actual turn-off time Toff of the transistor SR by a stray inductance time $T_{LSTRAY}$, which as shown in FIG. 9 corresponds to the time interval from time t1 to time t2.

Figure 10:
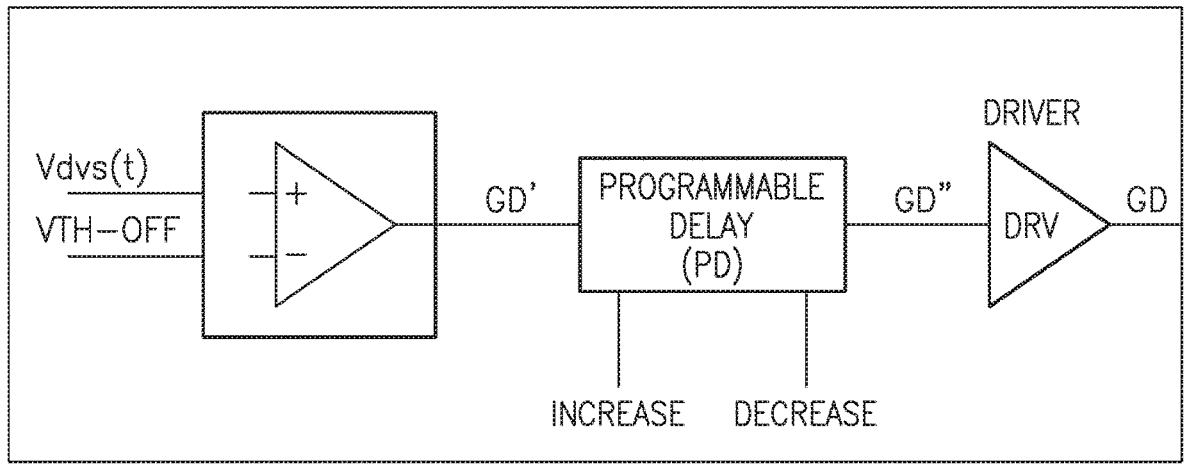
FIG. 10 is a functional block diagram illustrating the operation of the adaptive turn-off control algorithm in generating the gate drive signal control turn off of the synchronous rectifier transistor of FIG. 8.

This operation of the adaptive turn-off control algorithm as just described with reference to FIGS. 8 and 9 is represented in the functional diagram of FIG. 10. The actual voltage Vdvs(t) is compared to the threshold VTH-OFF, which is represented in the figure as a comparator, and upon detecting Vdvs(t)=VTH-OFF an initial gate drive signal GD' is generated. This initial gate drive signal GD' is then delayed with the programmable delay PD as previously described to generate a delayed gate drive signal GD" that is then provided through a driver DRV as the actual gate drive signal GD that is provided to control switching of the synchronous rectifier transistor SR. The programmable delay PD is incrementally adjusted, namely increased or decreased, to delay the turn OFF of the transistor SR until the actual conduction time $T_{diode}$ of the body diode Dbr of the transistor SR is approximately equal to the ideal conduction time $T_{diode-ideal}$ that the body diode Dbr would have in the absence of the stray inductance $L_{SR}$ ($L_{SR}$=Lsource+Ldrain+Ltrace), as described above.

Figure 11A:
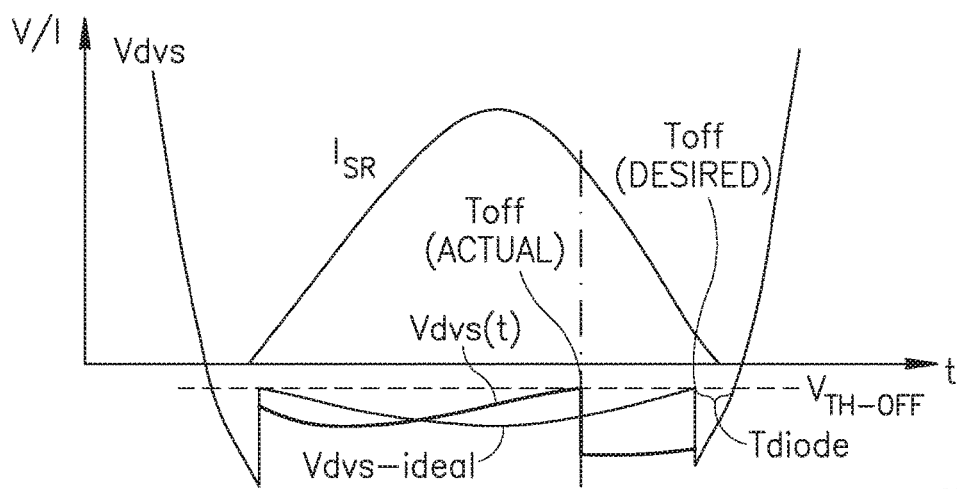
FIGS. 11A and 11B are signal timing diagrams that graphically illustrate the operation of the adaptive turn-off control algorithm as described with reference to FIGS. 8-10.
Figure 11B:
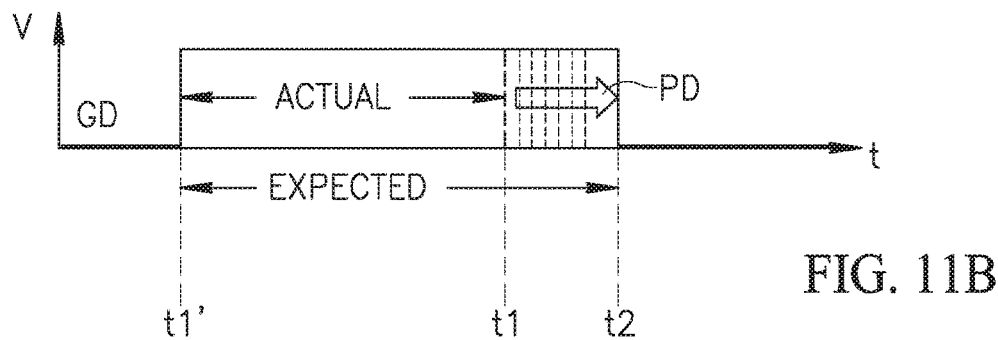

FIGS. 11A and 11B are signal timing diagrams that graphically illustrate the operation of the adaptive turn-off control algorithm as just described with reference to FIGS. 8-10. The voltage Vdvs and current ISR through one of the synchronous rectification transistors SR during a half-cycle SC during which that transistor is turned ON and then OFF are shown in FIG. 11A. FIG. 11B shows the gate drive signal GD that is applied by the control circuit 7 (FIG. 6) to turn ON the transistor SR at a time t1' to start the half-cycle SC, and to turn OFF of the transistor initially at time t1 and thereafter at times that are incrementally delayed relative to time t1 until the turn OFF of the transistor SR occurs at time t2. The time t2 corresponds to the desired turn OFF time of the transistor SR, meaning this is the time that makes the conduction time $T_{diode}$ of the body diode Dbr of the transistor SR equal to the ideal conduction time $T_{diode-ideal}$, as indicated in FIG. 11A. In FIG. 11A, the vertical axis represents voltage or current (V/I), namely voltage Vdvs and current $I_{SR}$, while the horizontal axis represents time t. Similarly, in FIG. 11B the vertical axis represents voltage V while the horizontal axis represents time t.

As seen in FIG. 11B, the gate drive signal GD initially goes low at time t1 to turn OFF the transistor SR. The adaptive turn-off control algorithm then measures the conduction time of body diode Dbr by comparing the voltage Vdvs(t) to the threshold $V_{TH}$-OFF as described in more detail in the U.S. Pat. No. 9,356,535. When the algorithm measures the conduction time $T_{diode}$ after the initial turn OFF at time t1, the algorithm determines whether the conduction time $T_{diode}$ is greater than the time $T_{diode-ideal}$ ($T_{diode}$>$T_{diode-ideal}$) and if so the algorithm adds an incremental delay $T_{step}$ to the initial turn OFF time at time t1, so the new turn-off time Toff=(Toff1+$T_{step}$). The algorithm continues incrementing the turn-off time Toff by the incremental delay $T_{step}$ each half-cycle SC of the switching converter 100. The algorithm does so for each half-cycle SC1, SC2, with the transistor SR1 being controlled, measured, and the turn-off time Toff adjusted in the first half-cycle SC1 and the transistor SR1 being controlled, measured, and the turn-off time Toff adjusted in the second half-cycle SC2. The present description describes the operation of the adaptive turn-off control algorithm for one half-cycle SC and applies to the control of each of the transistors SR1 and SR2 during the half-cycles SC1 and SC2, respectively.

FIG. 11B illustrates the operation of the adaptive turn-off control algorithm in incrementally delaying the gate drive signal GD from the time t1 to the time t2 at which the conduction time $T_{diode}$ is approximately equal to the ideal conduction time $T_{diode-ideal}$ ($T_{diode}$=$T_{diode-ideal}$) Each vertical dashed line represents the turn-off time Toff at the respective time steps $T_{step}$ added to the prior turn-off time Toff, with the algorithm adding an incremental delay $D_{step}$ each half-cycle SC to provide the new turn-off time Toff. In other words, the programmable delay PD (FIG. 10) is incrementally adjusted by the incremental delay $D_{step}$ each half-cycle SC to decrease the conduction time $T_{diode}$. This programmable delay PD is represented in FIG. 11B as an arrow PD pointing to the right between the times t1 and t2. The decreasing of the conduction time $T_{diode}$ of the body diode Dbr of the transistor SR to minimize the conduction time $T_{diode}$ until ($T_{diode}$=$T_{diode-ideal}$), as illustrated in FIG. 11B as just described, also corresponds to maximizing the conduction time of the transistor SR each half-cycle SC.

The description of the adaptive turn-off control algorithm set forth above with reference to FIGS. 8-11 ignores a gate discharge time of the transistor SR, along with additional factors associated with the actual operation of the transistor. Briefly, each transistor SR takes a finite time to turn OFF and thus does not completely turn OFF immediately in response to the gate drive signal GD. Thus, the actual deactivation of the gate drive signal GD occurs in advance of the desired turn OFF time of the transistor SR to compensate for the gate discharge time and other factors to ensure the transistor is turned completely OFF at the desired turn-off time, which is also described in more detail in the U.S. Pat. No. 9,356,535.

Figures 12A, 12B, 12C:
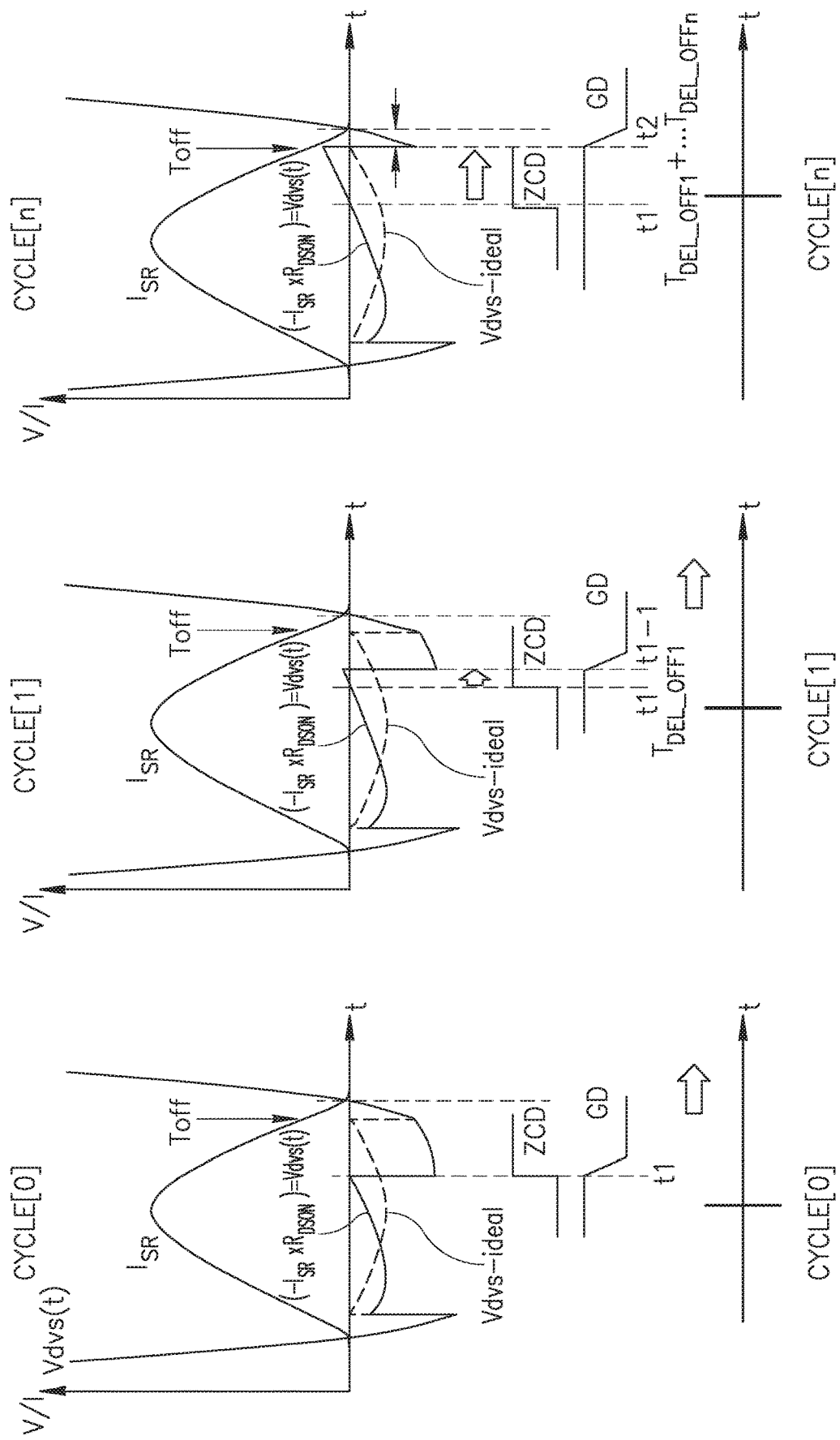
FIGS. 12A-12C are signal timing diagrams illustrating the operation of the adaptive turn-off control algorithm over a number of consecutive switching half-cycles.

FIGS. 12A-12C are signal timing diagrams illustrating the operation of the adaptive turn-off control algorithm over a number of consecutive switching half-cycles SC. In each of these figures, the horizontal axis is time t in the vertical axis represents current I and voltage V, with the current $I_{SR}$ and voltage Vdvs signals being shown in each signal diagram. The switching half-cycle SC of each is labeled separately, with an initial half-cycle CYCLE[0] shown in FIG. 12A, a next half-cycle CYCLE[1] shown in FIG. 12B, and an nth half-cycle CYCLE[n] shown in FIG. 12C. The ideal voltage $V_{dvs-ideal}$ of the transistor SR being controlled is illustrated as a dashed line in each of the FIGS. 12A-12C. During the half-cycle CYCLE[0] in FIG. 12A, a zero-crossing of the actual voltage Vdvs(t) is detected and in response thereto a zero-crossing detection signal ZCD is activated at a time t1. In response to the ZCD signal going active at time t1, the control circuit 7 (FIG. 6) deactivates the gate drive signal GD of the corresponding transistor SR being controlled during the half-cycle CYCLE[0], which is also shown in the figure. The situation in the half-cycle CYCLE[0] corresponds to the initial operation of the control circuit 7 in controlling the transistor SR in the rectifier 5 (FIG. 6), namely before the adaptive turn-off control algorithm has begun delaying the gate drive signal GD to start reducing the conduction time $T_{diode}$ of the body diode Dbr of the transistor SR.

In FIG. 12B, during the half-cycle CYCLE[1] the adaptive turn-off control algorithm delays the gate drive signal GD by a first delay $T_{DEL\_OFF}$ relative to the gate drive signal in the cycle CYCLE[0]. The delay $T_{DEL\_OFF}$ is accordingly a first incremental or step delay added to the gate drive signal GD to reduce the conduction time $T_{diode}$ of the body diode Dbr of the transistor SR as discussed above. Thus, during this initial half-cycle CYCLE[0] the programmable delay PD=0 and in the second half-cycle CYCLE[1] the programmable delay PD=$T_{DEL\_OFF}$, where this incremental delay is labelled $T_{DEL\_OFF1}$ in FIG. 12B. The adaptive turn-off control algorithm continues operating in this manner each of the next half-cycles CYCLE[2]-CYCLE[n−1], namely adding the incremental delay $T_{DEL\_OFF}$ to the programmable delay PD of the gate drive signal GD each half-cycle and measuring the conduction time $T_{diode}$ of the body diode Dbr of the transistor SR. Finally, in the nth half-cycle CYCLE[n], the programmable delay PD=$T_{DEL\_OFF1}$+$T_{DEL\_OFF2}$+$T_{DEL\_OFF3}$+$T_{DEL\_OFF4}$+$T_{DEL\_OFFn}$, where the delay $T_{DEL\_OFF2}$ is the incremental delay added during the half-cycle CYCLE[1], $T_{DEL\_OFF3}$ is the incremental delay added during the half-cycle CYCLE[2], delay $T_{DEL\_OFF4}$ is the incremental delay added during the half-cycle CYCLE[3], and delay $T_{DEL\_OFFn}$ is the incremental delay added during the half-cycle CYCLE[n]. In the cycle CYCLE[n], the conduction time $T_{diode}$ of the body diode Dbr of the transistor SR is approximately equal the ideal conduction time $T_{diode-ideal}$ and thus the gate drive signal GD is operated with this programmable delay PD in cycle CYCLE[n] and subsequent cycles to control the deactivation of the transistor SR. In this way, the adaptive turn-off control algorithm accounts for the stray inductance $L_{SR}$ associated with the transistor SR to turn OFF the transistor at the proper time each half-cycle to minimize the conduction time to $T_{diode}$ of the body diode Dbr and improve the efficiency of the switching converter 100. As the actual conduction time $T_{diode}$ approaches the ideal conduction time $T_{diode-ideal}$, the adaptive turn-off control algorithm may increment, or decrement, the programmable delay PD by a smaller or finer incremental delay than the incremental delay $T_{DEL\_OFF}$ initially utilized to increment this programmable delay in order to provide a final programmable delay PD that results in an actual conduction time $T_{diode}$ that is more closely equal to the ideal conduction time $T_{diode-ideal}$, as described in more detail in the U.S. Pat. No. 9,356,535.

This operation of the adaptive turn-off control algorithm as described above assumes that the anticipatory effects of the stray inductance $L_{STRAY}$=$L_{SR}$ is constant with respect to the switching frequency $\omega_{sw}$ of the switching converter 100. Under this assumption, however, after a transient in the load current $I_O/I_{LOAD}$ of the switching converter 100, the output voltage $V_O$ of the converter decreases or increases, resulting in a primary control loop of the switching converter driving the resonant circuit 30 (FIG. 6) at a new switching frequency $\omega_{sw}$. Although not described in detail herein, the primary control loop of the resonant switching converter 100 compares the regulated output voltage $V_O$ to a desired value and adjusts the switching frequency $\omega_{sw}$ of the switching converter to maintain the regulated output voltage at this desired value, as will be understood by those skilled in the art. This new switching frequency $\omega_{sw}$ of the switching converter 100 results in a different anticipatory effect of the stray inductance $L_{SR}$ on the voltage Vdvs(t) across the synchronous rectification transistors SR. While this is true, after such a transient in the load current $I_O/I_{LOAD}$ and subsequent variation in the load switching frequency $\omega_{sw}$ of the switching converter 100, the adaptive turn-off control algorithm continues using the last value of programmable delay PD determined prior to the transient in the load current.

Typically, this operation results in the adaptive turn-off control algorithm continuing to turn OFF the transistor SR earlier than the zero-crossing of the current $I_{SR}$ through the transistor SR and avoiding current inversion, which was described in more detail above. Where the switching converter 100 experiences a high-to-low transient in the load current $I_O/I_{LOAD}$, however, the regulated output voltage $V_O$ can experience some "overshoot," meaning the regulated output voltage becomes greater than the desired regulated output voltage. As a result, the primary control loop increases the switching frequency $\omega_{sw}$ to decrease the regulated output voltage $V_O$ towards the desired value.

In a first approximation, the anticipation effect of the stray inductance $L_{SR}$ can be considered a constant parameter, but in some specific cases this approximation is insufficient to describe the real phenomenon of this stray inductance. In these cases, after a transient from a maximum or full load current $I_O/I_{LOAD}$ to a zero load current, the regulated output voltage $V_O$ increases beyond the desired value because the primary control loop is not fast enough to control the switching converter to balance this transient. As a result, the primary control loop increases the switching frequency $\omega_{sw}$ to compensate for this variation in the regulated output voltage $V_O$ and the anticipation effect of the stray inductance $L_{SR}$ is reduced. This means that if the adaptive turn-off control algorithm goes on exploiting the last adaptive turn-off delay value, namely the last value of the programmable delay PD, the transistor SR is turned OFF later which may result in current inversion of the current ISR.

Figure 13A:
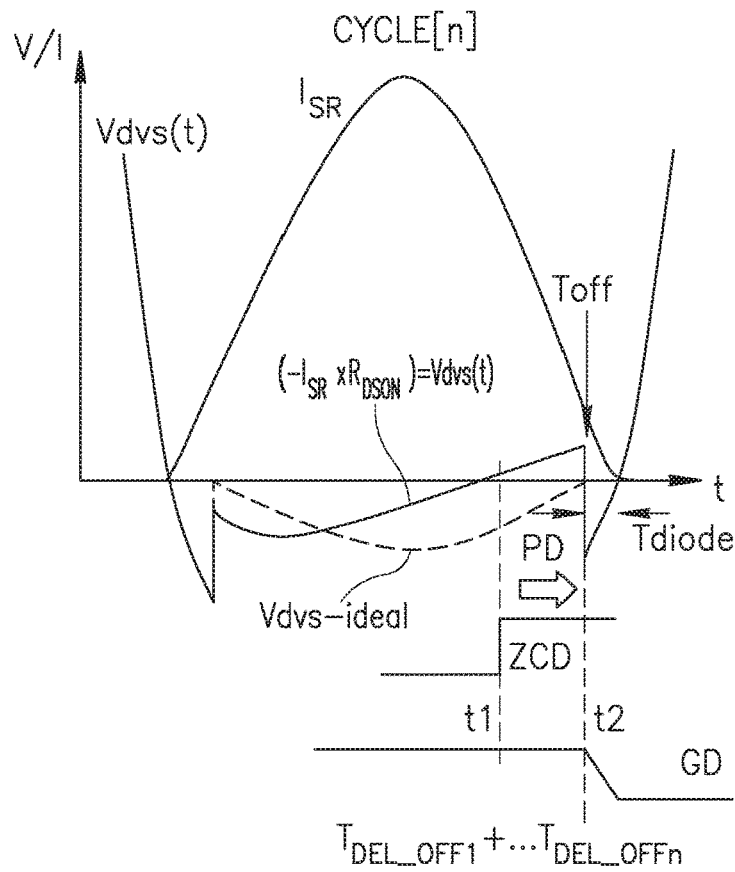
FIGS. 13A and 13B illustrate current inversion of a synchronous rectification current through a synchronous rectifier transistor where a switching converter experiences a full-to-zero load current transient.
Figure 13B:
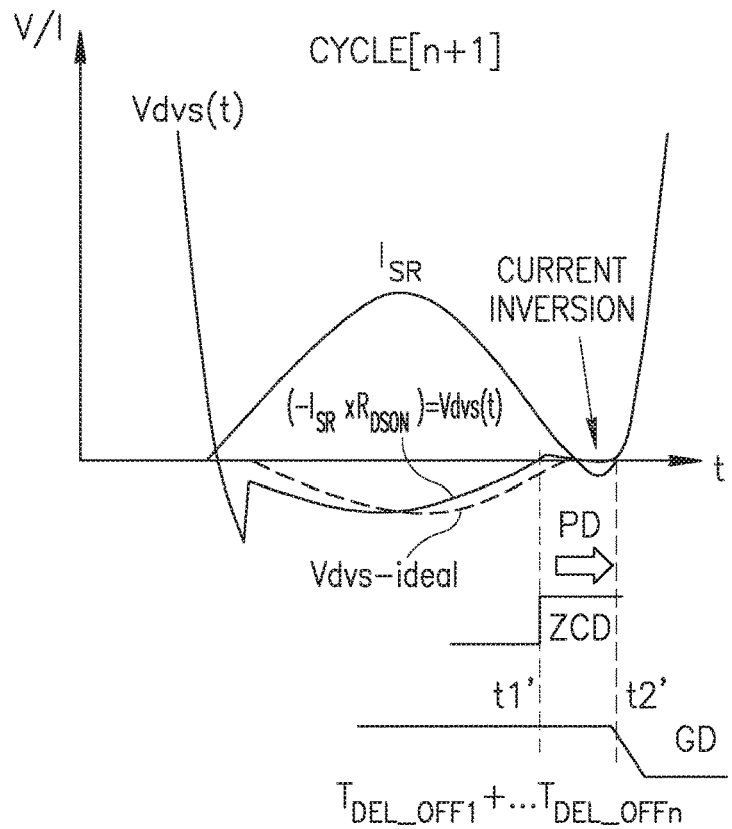

FIGS. 13A and 13B illustrate the current inversion of the current $I_{SR}$ that can occur in the situation described above for a transient from a maximum or full load current $I_O/I_{LOAD}$ to a zero load current, which will be referred to as a "full-to-zero load current transient" in the present description. FIG. 13A illustrates operation of the switching converter 100 prior to the full-to-zero load current transient and corresponds to the operating condition described above for the cycle CYCLE[n] in FIG. 12C and subsequent half-cycles once the programmable delay PD (PD=$T_{DEL\_OFF1}$+$T_{DEL\_OFF2}$ . . . +$T_{DEL\_OFFn}$) has been adjusted such that the conduction time $T_{diode}$=$T_{diode-ideal}$.

FIG. 13B illustrates operation in a half-cycle CYCLE[n+1] after a full-to-zero load current transient has occurred and the switching frequency $\omega_{sw}$ is increased to compensate for the overshoot of the regulated output voltage $V_O$. As seen in FIG. 13B, the anticipatory effect of the stray inductance $L_{SR}$ is reduced in the cycle CYCLE[n+1], resulting in the zero-crossing of the voltage Vdvs(t) occurring at time t1' that is later in time than the time t1. The actual voltage Vdvs(t) in FIG. 13B is delayed relative to FIG. 13A (i.e., the anticipatory effect of the stray inductance $L_{SR}$ is less) and the resulting Vdvs(t) voltage is closer to the ideal voltage Vdvs-ideal shown in the dashed line. As a result, when the zero-crossing of the voltage Vdvs(t) is detected at time t1' and the deactivation of the gate drive signal GD delayed by the programmable delay PD from this point, the gate drive signal does not deactivate the transistor SR until time t2' which is later in time relative to time t2. During the programmable delay PD in FIG. 13B (i.e., from the time t1' to the time t2' in FIG. 13B) the transistor SR is still turned ON and current inversion of the current $I_{SR}$ occurs. This current inversion of the current $I_{SR}$ is labelled in FIG. 13B and corresponds to the current becoming negative and thus flowing from the output node OUTN (FIG. 6) to ground and thus undesirably discharge the output node OUTN, as previously mentioned above with reference to FIG. 6.

In order to better describe this phenomenon, a closed-form expression for the anticipation effect of the stray inductance $L_{SR}$ is required. To obtain such a closed-form expression, assume the current $I_{SR}$ has an almost sinusoidal shape during the last part of the switching cycle according to the following equation:

$$I_{SR}(t) = I_{PK} \cdot \sin(\omega_{sw} \cdot t) \quad \text{Eqn. 1}$$

Under these conditions, the actual or real voltage $V_{DVS}(t)$ is given by the following equation:

$$V_{DVS}(t) = R_{DS(on)} \cdot I_{SR}(t) + L_{SR} \cdot \frac{\partial I_{SR}(t)}{\partial t} = \quad \text{Eqn. 2}$$
$$R_{DS(on)} \cdot I_{PK} \cdot \sin(\omega_{SW} \cdot t) + L_{SR} \cdot \omega_{SW} \cdot I_{PK} \cdot \cos(\omega_{SW} \cdot t)$$

This expression can be rewritten splitting the time component and the phase shift component as follows:

$$V_{DVS}(t) = K \cdot \sin(\omega_{SW} \cdot t - \varphi) = K \cdot \quad \text{Eqn. 3}$$
$$\sin[\omega_{SW} \cdot (t - \boxed{\varphi/\omega_{SW}})] \xrightarrow{\overset{L_{STRAY}}{\text{anticipation}}} \boxed{T_{L_{SR}} = \varphi/\omega_{SW}}$$
$$V_{DVS}(t) = K \cdot \sin(\omega_{SW} \cdot t - \varphi) =$$
$$K \cdot \sin(\omega_{SW} \cdot t) \cdot \cos(\varphi) + K \cdot \cos(\omega_{SW} \cdot t) \cdot \sin(\varphi)$$

where $T_{L_{SR}}$ is an anticipation time caused by the stray inductance $L_{SR}$. The anticipation time $T_{L_{SR}}$ of Eqn. 3 is referred as $T_{LSR}$ in the following description (i.e., $T_{L_{SR}} = T_{LSR}$). Equating Eqns. (2) and (3) it is possible to obtain the following expression for the phase shift:

$$\begin{cases} K \cdot \sin(\varphi) = L_{SR} \cdot \omega_{SW} \cdot I_{PK} \\ K \cdot \cos(\varphi) = R_{DS(on)} \cdot I_{PK} \end{cases} \rightarrow \varphi = \arctan\left(\frac{L_{SR}}{R_{DS(on)}} \cdot \omega_{SW}\right) \quad \text{Eqn. 4}$$

$$T_{L_{SR}} = \varphi/\omega_{SW} = \frac{1}{\omega_{SW}} \arctan\left(\frac{L_{SR}}{R_{DS(on)}} \cdot \omega_{SW}\right) \approx \frac{L_{SR}}{R_{DS(on)}} \quad \text{Eqn. 5}$$

The resistance $R_{DS(on)}$ is the ON resistance of the synchronous rectifier transistor SR, and is also referred to as $R_{dson}$ in the above description, as previously mentioned.

Figure 14:
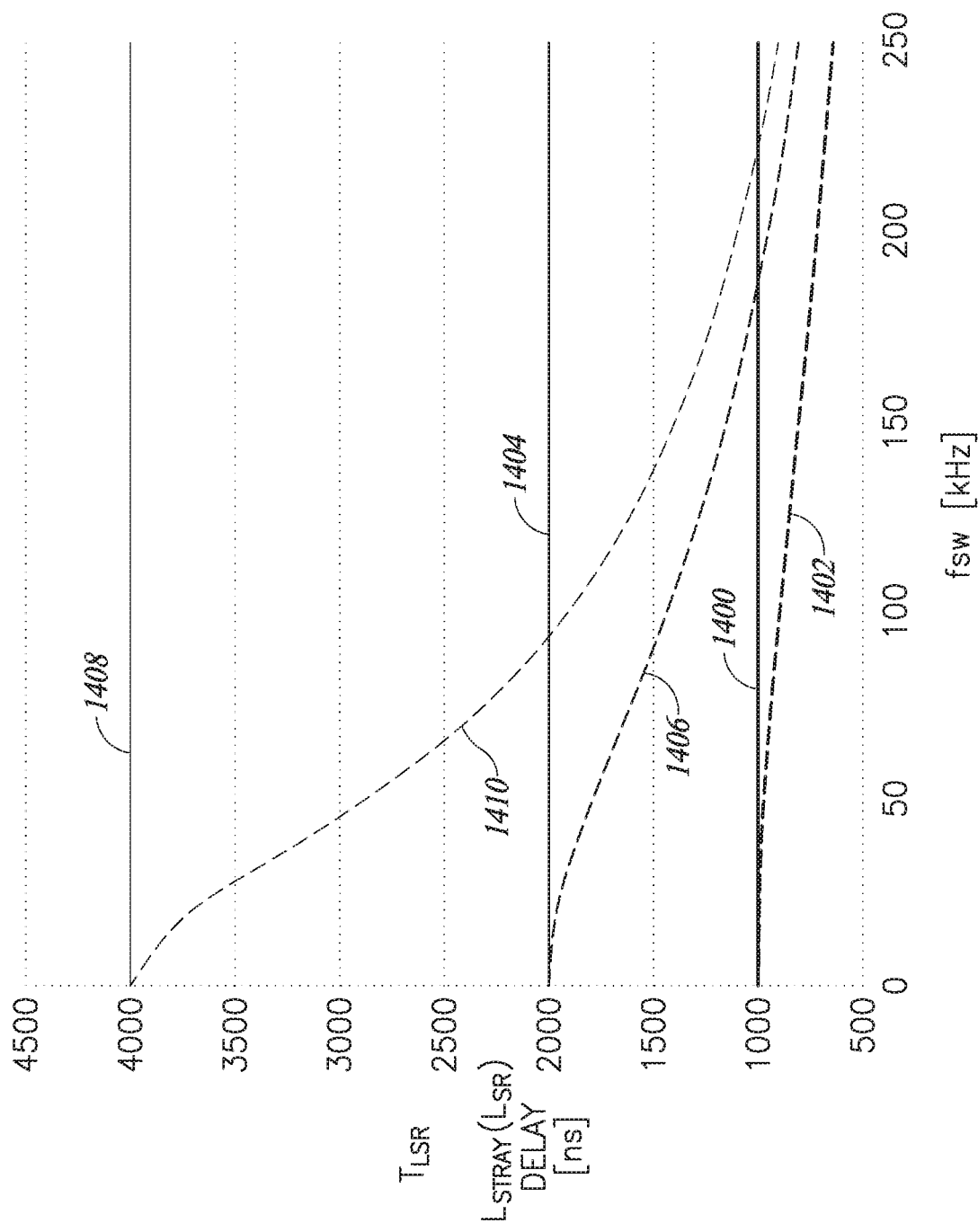
FIG. 14 is a signal timing diagram showing plots of three different values for a linear approximation of an anticipation time along with the actual anticipation time as a function of switching frequency of a switching converter.

The last approximation in Eqn. (5) is for the anticipation time $T_{LSR}$ and is true only when $$\frac{L_{SR}}{R_{DS(on)}} \ll 1/\omega_{SW},$$

and in this situation the anticipation time $T_{LSR}$ is constant as a function of the switching frequency $f_{sw}$ ($\omega_{sw}=2\pi \cdot f_{sw}$). This is a linear approximation of the arctan function and applies where the argument ($L_{SR}/R_{DS(on)} \cdot \omega_{sw}$) is much less than one (($L_{SR}/R_{DS(on)} \cdot \omega_{sw}$)<<1). FIG. 14 is a graph showing plots of three different values for the linear approximation of the anticipation time $T_{LSR}$ along with the anticipation time $T_{LSR}$ as given by Eqn. 5 as a function of switching frequency $f_{sw}$ for these three values of this approximation. In FIG. 14, the line 1400 is the linear approximation of the anticipation time $T_{LSR}$ where the stray inductance $L_{SR}$=4 nH, and the ON resistance $R_{DS(on)}$=4 mΩ so that $T_{LSR}$=(4 nH/4 mΩ)=1 µs=1000 ns. The line 1402 shows the plot of Eqn. 5 where $L_{SR}/R_{DS(on)}$=1000 ns. Similarly, the line 1404 is the linear approximation of the anticipation time $T_{LSR}$ where the stray inductance $L_{SR}$=8 nH, and the ON resistance $R_{DS(on)}$=4 mΩ so that anticipation time $T_{LSR}$=(8 nH/4 mΩ)=2 µs=2000 ns and the line 1406 shows the plot of Eqn. 5 where $L_{SR}/R_{DS(on)}$=2000 ns. Finally, the line 1408 is the linear approximation of the anticipation time $T_{LSR}$ where the stray inductance $L_{SR}$=16 nH, and the ON resistance $R_{DS(on)}$=4 mΩ so that anticipation time $T_{LSR}$=(16 nH/4 mΩ)=4 µs=4000 ns and the line 1410 shows the plot of Eqn. 5 where $L_{SR}/R_{DS(on)}$=4000 ns.

FIG. 14 shows how the actual or real anticipation time $T_{LSR}$ varies as a function of switching frequency $f_{sw}$. The adaptive turn-off control algorithm assumes the linear approximation for the anticipation time $T_{LSR}$ and accordingly assumes the value of the anticipation time does not vary as a function of switching frequency $f_{sw}$, which is not accurate over the range of switching frequencies shown in FIG. 14. After a high-to-low transient in the load current Iload, the primary control loop of the resonant switching converter 100 (FIG. 6) increases the switching frequency $f_{sw}$ to compensate for variation in the output voltage Vout to thereby provide desired regulation of this output voltage. This variation ($\Delta f_{sw}/f_{sw}$) in the switching frequency $f_{sw}$ could be on the order of 10%-15%, which causes a change or variation $\Delta T$ of the anticipation time $T_{LSR}$ on the order of 50 ns, which is comparable to turn-off time of the transistor SR or the target body diode conduction time $T_{diode-ideal}$. In this situation, namely a high-to-low load current transient, the variation $\Delta T$ is more specifically a reduction in the anticipation time $T_{LSR}$. If the variation $\Delta T$ of the anticipation time $T_{LSR}$ reaches or exceeds the target or desired conduction time $T_{diode-ideal}$ (e.g., 50 ns) of the body diode Dbr, current inversion occurs where the synchronous rectifier current Isr through the transistor SR reverses direction, as previously described.

Figure 15:
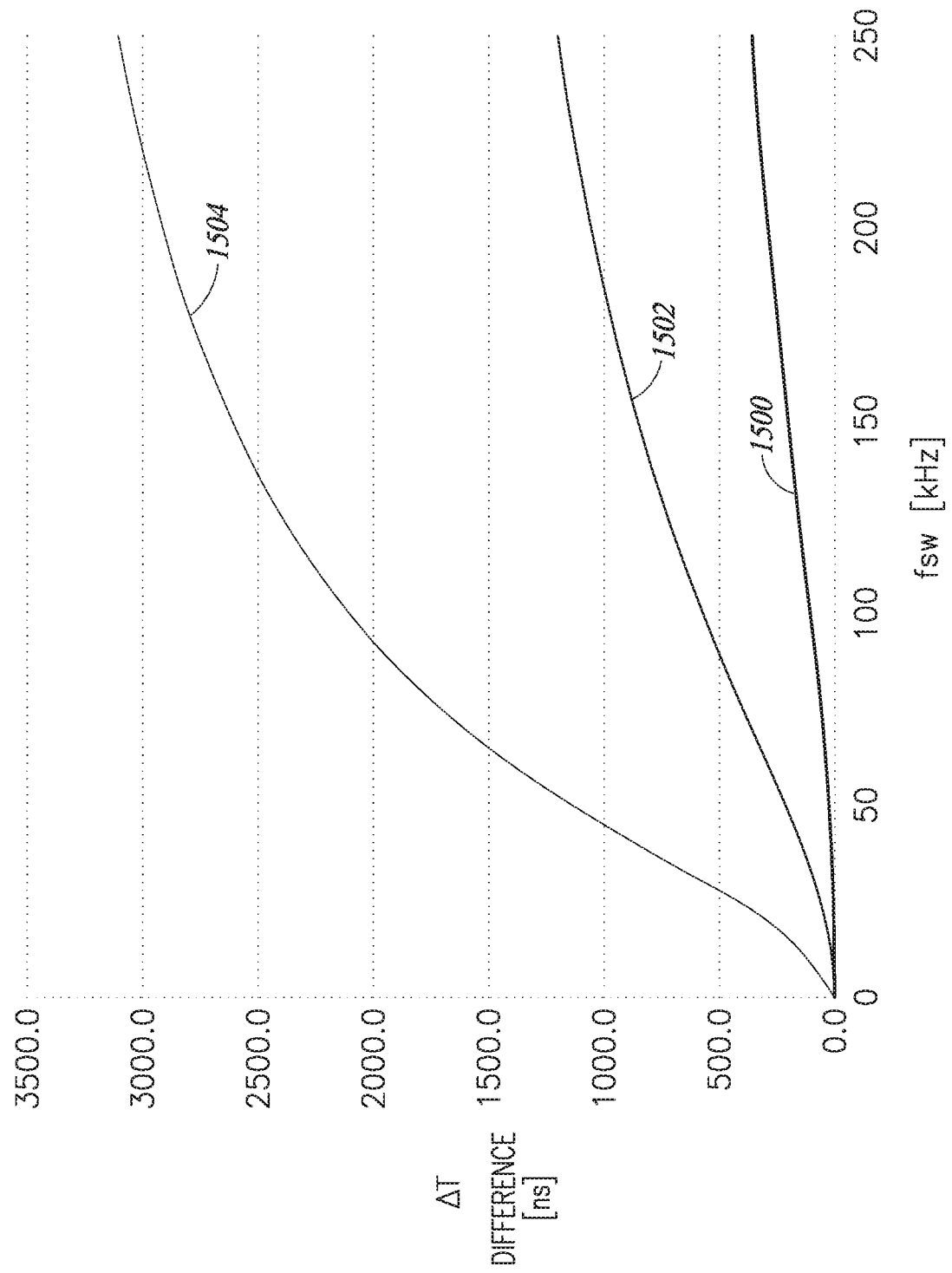
FIG. 15 is a signal timing diagram of the difference between the actual anticipation times of FIG. 14 and their linear approximations as a function of the switching frequency.

FIG. 15 is a graph of the variation $\Delta T$ of the anticipation time $T_{LSR}$ as a function of the switching frequency $f_{sw}$. The variation $\Delta T$ in the anticipation time $T_{LSR}$ represents the error or variation between the ideal constant linear approximation value of the anticipation time $T_{LSR}$ and the real or actual value of the anticipation time as a function of switching frequency $f_{sw}$. The line 1500 shows the variation $\Delta T$ of the anticipation time $T_{LSR}$ from the linear approximation value of $T_{LSR}$=(4 nH/4 mΩ)=1 µs=1000 ns as a function of switching frequency $f_{sw}$. The line 1502 shows the variation $\Delta T$ of the anticipation time $T_{LSR}$ from the linear approximation value of $T_{LSR}$=(8 nH/4 mΩ)=2 µs=2000 ns as a function of switching frequency $f_{sw}$ while the line 1504 shows the variation $\Delta T$ of the anticipation time $T_{LSR}$ from the linear approximation value of $T_{LSR}$=(16 nH/4 mΩ)=4 µs=4000 ns as a function of switching frequency.

Figure 16A:
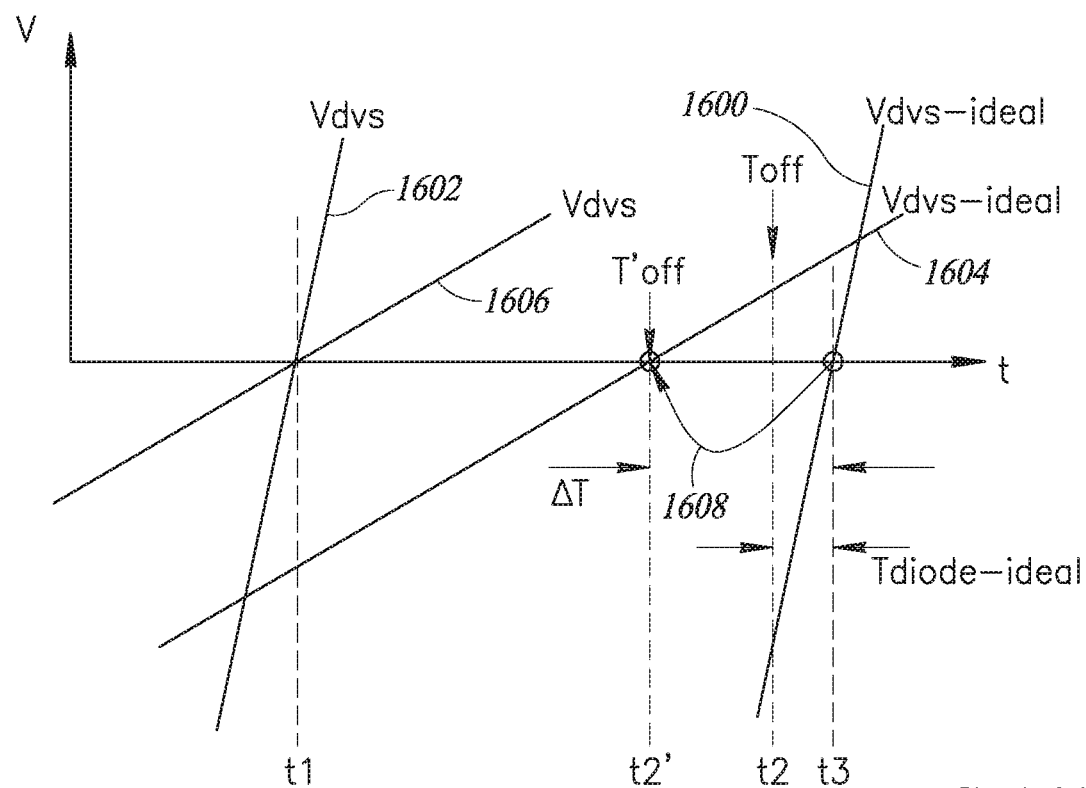
FIGS. 16A-16C are signal timing diagrams illustrating how the variation of the anticipation time resulting from a change in the switching frequency results in current inversion in the context of the adaptive turn-off control algorithm.
Figure 16B:
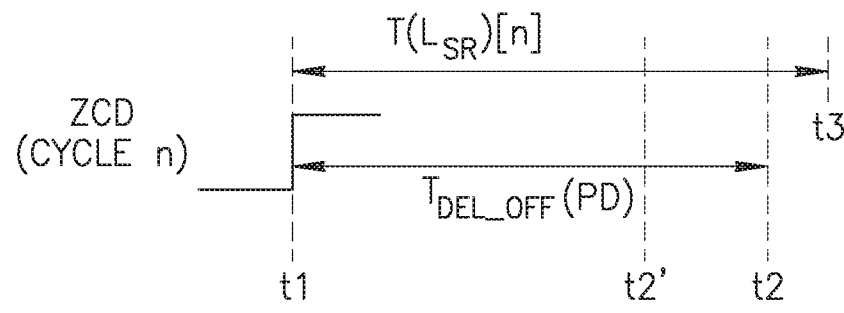
Figure 16C:
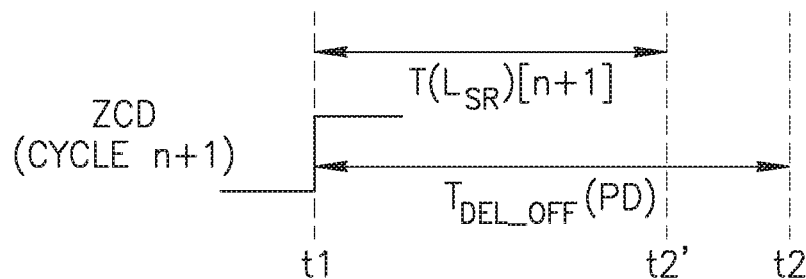

FIGS. 16A-16C are signal timing diagrams illustrating how the variation $\Delta T$ of the anticipation time $T_{LSR}$ resulting from a change in the switching frequency $f_{sw}$ from a half-cycle n to the next half-cycle n+1 results in current inversion in the context of the adaptive turn-off control algorithm. In the example of FIGS. 16A-16C, the switching converter 100 experiences a high-to-low current transient. If the variation $\Delta T$ of the anticipation time $T_{LSR}$ is greater than a target turn-off time Toff according to the adaptive turn-off algorithm, a current inversion of the current $I_{SR}$ caused by the delayed turn-off Toff provided by the adaptive turn-off control algorithm can occur. In FIG. 16A, the vertical axis is the voltage of the Vdvs signal and the horizontal axis is time t. In FIGS. 16B and 16C the vertical axis is the voltage of the output signal ZCD indicating a zero-crossing event of the drain-source voltage Vdvs of the transistor SR (FIG. 6) and the horizontal axes are time t.

FIGS. 16A-16C show, for a first half-cycle n, the ideal voltage signal Vdvs-ideal 1600 and the real or actual signal Vdvs 1602 for this first half-cycle n. The cycle n is the cycle before the load transient occurs. Similarly, in a second half-cycle n+1 the ideal voltage signal Vdvs-ideal 1604 and the real or actual signal Vdvs 1606 for this second half-cycle are shown, where the load transient occurs between the cycle n and cycle n+1. The ideal signals Vdvs 1600, 1604 are not affected by the stray inductance $L_{SR}$ and thus these signals are directly proportional to the current $I_{SR}$. In contrast, the real or actual signals Vdvs 1602, 1606 are affected by the stray inductance $L_{SR}$ and the variation ΔT of the anticipation time $T_{LSR}$ due to the change in switching frequency $f_{sw}$ from the half-cycle n to the half-cycle n+1.

FIG. 16A shows these various ideal and actual signals DVS during the half-cycles n and n+1, with the time t along the horizontal axis being expanded or zoomed-in near the zero crossing of the load current Iload associated with the signals in the figure. The load current Iload (FIG. 6) is equal to the currents (ISR1+ISR2), where one of these currents ISR1, ISR2 is equal to zero each half-cycle SC so that the load current Iload is equal to either ISR1 or ISR2 each half-cycle. FIG. 14 illustrates the effect of the variation ΔT of the anticipation time $T_{LSR}$ between the half-cycle n before the load transient and cycle n+1 after the load transient. The anticipation time $T_{LSR}$ of the half-cycle n is designated $T_{LSR}$[n] and the anticipation time $T_{LSR}$ of the half-cycle n+1 is designated $T_{LSR}$ [n+1] in the figure.

As seen in FIGS. 16A-16C, the anticipation time $T_{LSR}$[n+1] (FIG. 16C) is less than the anticipation time $T_{LSR}$[n] (FIG. 16B) due to the increase of the switching frequency $f_{sw}$ from the cycle n to the cycle n+1. The zero-crossing of the voltage Vdvs occurs at a time t1 for each of the half-cycles n and n+1. In the half-cycle n, the programmable delay PD provided by the adaptive turn-off control algorithm is a time starting from the detection of the zero-crossing of the voltage Vdvs at time t1 until the turn-off time Toff at a time t2. The duration of this programmable delay PD is also designated as the period $T_{DEL\_OFF}$ from time t1 to t2 in the figures. As seen in FIGS. 16A and 16B, in the half-cycle n, prior to the load transient, the programmable delay PD provided by the adaptive turn-off control algorithm turns OFF the transistor SR at the time Toff=t2 in the figure, providing the ideal conduction time $T_{diode-ideal}$ for the body diode Dbr of the transistor.

Referring to FIG. 16C, in the half-cycle n+1 after the occurrence of the load transient, the adaptive turn-off control algorithm again provides the programmable delay PD to turn OFF the transistor SR at the time Toff=t2. While this is true, the change in switching frequency $f_{sw}$ due to the load transient and resulting change in the anticipation time $T_{LSR}$[n+1] means the zero-crossing of the ideal signal Vdvs-ideal occurs earlier as seen in the figures, and the transistor SR should be turned OFF earlier at time T'$_{off}$ which is at a time t2' in FIGS. 16A-16C. The anticipation time $T_{LSR}$[n+1] corresponds to the time from time t1–t2'. The adaptive turn-off control algorithm does not, however, turn OFF the transistor SR at time the T'$_{off}$ but again turns OFF the transistor at time Toff. As a result, the zero-crossing of signal Vdvs occurs at time t2' in half-cycle n+1 but the transistor SR is not turned OFF until time t2, resulting in current inversion of the current ISR (i.e., ISR goes negative) prior to the transistor being turned OFF. This current inversion is undesirable as previously discussed.

As seen from this description of the adaptive turn-off control algorithm with reference to FIGS. 16A-16C, the programmable delay PD evaluated during the half-cycle n is used for half-cycle n+1. This programmable delay PD is updated only at the end of half-cycle n+1 and this update delay then used in the next half-cycle n+2. When the anticipation time $T_{LSR}$ is constant no problem in the operation of the adaptive turn-off control algorithm results. When there is a variation of the anticipation time $T_{LSR}$ due to a high-to-low load current transient as described with reference to FIGS. 16A-16C, however, due to the variation of the switching frequency $f_{sw}$ a current inversion can occur as just described. As illustrated in FIGS. 16B and 16C, in this situation $T_{LSR}$[n+1]<$T_{LSR}$[n] and this reduction in the anticipation time ΔT (i.e., from t3 to t2') results in a delay turning OFF of the transistor SR, causing the unwanted current inversion of the current $I_{SR}$.

Figure 17D:
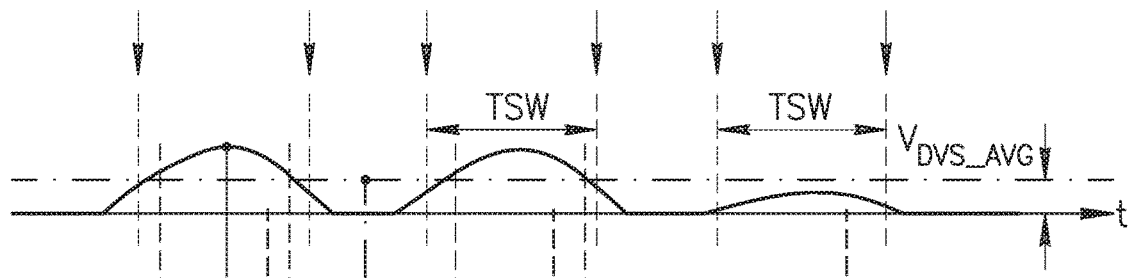

FIGS. 17A-17F are signal timing and functional diagrams illustrating operation of a current inversion prevention control algorithm for controlling operation of the rectifier 5 of the switching converter 100 of FIG. 6 to prevent current inversion even in the presence of load current transients according to one embodiment of the present disclosure. FIG. 17A is signal timing diagram showing the drain-to-source voltage signal Vdvs of the activated transistor SR1, SR2. More specifically, a first half-cycle CYCLE[n] is shown in which the transistor SR1 is activated (i.e., turned ON). The current and voltage associated with the transistor SR1 are labelled $I_{SR1}$ and $V_{DVS1}$, respectively. A second half-cycle CYCLE[n+1] is shown in which the transistor SR2 is activated, with the current and voltage associated with the transistor SR2 being labelled $I_{SR2}$ and $V_{DVS2}$, respectively. Finally, a third half-cycle CYCLE[n+2] is shown in which the transistor SR1 is once again activated and the current $I_{SR1}$ and voltage $V_{DVS1}$ shown for this half-cycle.

Figure 17E:
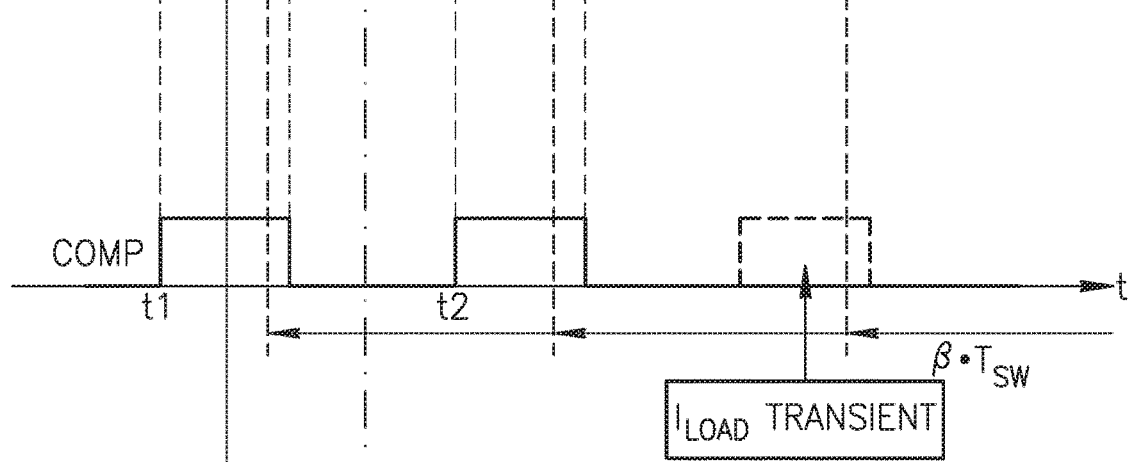
Figure 17F:
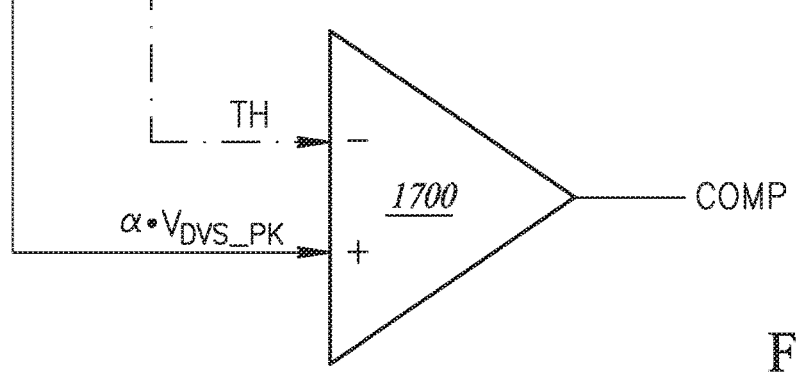

FIGS. 17B and 17C are signal timing diagrams showing the gate drive signals GD1, GD2 applied to control the activation and deactivation (i.e., turning ON and OFF) of the transistors SR1 and SR2, respectively, as shown in FIG. 6. FIG. 17D shows the magnitude of the voltage Vdvs across the activated transistor SR1 or SR2, which is compared to a threshold TH=($\alpha \cdot V_{DVS\_PK}$) in each of the half-cycles CYCLE[n], CYCLE[n+1] and CYCLE[n+2], which is represented through a comparator 1700 shown in FIG. 17F, as will be described in more detail below. The parameter α is a threshold adjustment factor that will be discussed in more detail below. FIG. 17E shows an output signal COMP generated by the comparator 1700, as will also be described in more detail below. Each of the FIGS. 17A-17E shows voltage, or voltage and current, along the vertical axis and time t along the horizontal axis.

The control circuit 7 of FIG. 6 is configured to execute this current inversion prevention control algorithm, where this control circuit may be formed through suitable circuitry that will be understood by one skilled in the art, such as hardware, software or firmware executing on suitable processing circuitry, or combinations of these types of circuits. In operation, the current inversion prevention control algorithm detects the voltage signals Vdvs of the transistor SR and controls the transistor to avoid current inversion of the current $I_{SR}$ before the transistor is turned OFF each half-cycle, as will now be explained in more detail with reference to FIGS. 17-19. As previously mentioned, the current inversion prevention control algorithm is described in the present application in the context of or as being used with the adaptive turn-off control algorithm, but may also be utilized with other control algorithms utilized to control the transistors SR in a rectification circuit of a switching converter.

In operation, the current inversion prevention control algorithm compares the actual voltage signal Vdvs sensed each half-cycle SC with a peak voltage reference threshold TH that is calculated cycle-by-cycle from the sensed voltage signal Vdvs each half-cycle. Cycle-by-cycle means the voltage signal Vdvs of the transistor SR1, SR2 being activated each half-cycle SC is sensed, and it is utilized in calculating the threshold TH. The result of this comparison is then used each half-cycle SC to prevent current inversion of the current $I_{SR}$ if a high-to-low load current transient occurs, with this comparison being represented as the comparator 1700 in FIG. 17, as will now be explained in more detail. The peak voltage reference threshold TH actually includes a first peak voltage reference threshold for the voltage signal Vdvs of the transistor SR1 and a second peak voltage reference threshold for the transistor SR2, as will be described in more detail below with reference to FIG. 18.

The current inversion prevention control algorithm evaluates the average voltage $V_{DVS\_AVG}$ of the voltage signal Vdvs during a conduction time TSW of the transistor SR over the previous N half-cycles SC. This average voltage signal $V_{DVS\_AVG}$ of the signal Vdvs is not affected by the stray inductance $L_{SR}$ and is proportional to the load current Iload. Recall, the load current Iload=ISR1+ISR2 (see FIG. 6). If the current $I_{SR}$ is approximated to have an almost sinusoidal shape during the last part of the switching half-cycle SC, the average $V_{DVS\_AVG}$ and the peak $V_{DVS\_PK}$ of the voltage signal Vdvs are related according through the following equation:

$$V_{DVS\_PK} = \frac{\pi}{2} \cdot V_{DVS\_AVG} \qquad \text{Eqn. 6}$$

This means that it is possible to calculate the peak value $V_{DVS\_PK}$ of the Vdvs signal from the average value $V_{DVS\_AVG}$. Thus, the current inversion prevention control algorithm determines the peak voltage reference threshold TH based on the peak value $V_{DVS\_PK}$, with the threshold TH, for example, being set equal to 75% of the peak value $V_{DVS\_PK}$. Thus, the peak voltage reference threshold TH= ($\alpha \cdot V_{DVS\_PK}$), where a is a threshold adjustment factor and $\alpha$=0.75 in the example being described. The current inversion prevention control algorithm then compares this peak voltage reference threshold TH to the actual voltage signal Vdvs during the conduction time TSW of the transistor SR.

In operation, during half-cycles SC in which no load current transient occurs, the comparator 1700 generates the output signal COMP that goes active within a certain percentage of the conduction time TSW of the transistor SR during that half-cycle SC. In the example of FIGS. 17A-17E, the comparator 1700 activates the COMP signal within, for example, 75% of the conduction time TSW when no load current transient has occurred. The conduction time TSW is multiplied by a conduction time adjustment factor β to define this certain percentage of the conduction time, where β=0.75 in the example embodiment being described. The COMP signal generated by comparator 1700 is shown in FIG. 17E. During the first half-cycle CYCLE[n] the comparator 1700 compares the voltage signal $V_{DVS1}$ of the activated transistor SR1 to the threshold TH=($\alpha \cdot V_{DVS\_PK}$). This threshold TH is related to average value $V_{DVS\_AVG}$ of the voltage signal Vdvs through Eqn. 6 as previously described, with the average value $V_{DVS\_AVG}$ being shown in FIG. 17D. No load current transient occurs in CYCLE[n] and thus at a time t1 the comparator 1700 detects the voltage $V_{DVS1}$ has reached the threshold TH and activates the COMP signal. The same operation occurs in the second illustrated half-cycle CYCLE[n+1], with the comparator 1700 comparing the voltage signal $V_{DVS2}$ of the activated transistor SR2 to the threshold TH=($\alpha \cdot V_{DVS\_PK}$). At time t2, the comparator 1700 detects the voltage signal $V_{DVS2}$ has reached the threshold TH and activates the COMP signal.

This operation of the comparator 1700 in generating the COMP signal in CYCLE[n] and CYCLE[n+1} illustrates that in half-cycles SC where no load current transient has occurred, the sensed voltage signal $V_{DVS1}, V_{DVS2}$ reaches the threshold within a certain percentage (as defined by adjustment parameter β) of the conduction time TSW of the activated transistor SR1, SR2. Conversely, where a load current transient occurs the comparator 1700 does not activate the COMP signal within this certain percentage of the conduction time TSW, as will now be explained in more detail with reference to CYCLE[n+2] illustrated in FIGS. 17A-17F. In this example, a high-to-low load current transient, such as from maximum load current to zero load current Iload, occurs between the CYCLE[n+1] and the CYCLE[n+2], as represented by arrow 1702 in FIG. 17A. As a result of this load current transient, the voltage $V_{DVS1}$ sensed by the comparator 1700 in the cycle CYCLE[n+2] does not reach the threshold TH=($\alpha \cdot V_{DVS\_PK}$) within the certain percentage of the conduction time TSW. In fact, in the illustrated example the voltage $V_{DVS1}$ does not reach the threshold TH at all in CYCLE [n+2]. The comparator 1700 therefore does not activate the COMP signal in CYCLE[n+2], which can be used to indicate the detection of a load current transient and corresponding adjustment to the control of the switching converter 100 (FIG. 6) to prevent current inversion of the current $I_{SR}$, as will now be explained in more detail.

Before describing this operation in detail, it should be pointed out that the operation of the comparator 1700 in the CYCLE[n+2] in detecting the load current transient through the COMP signal occurs before the end of the conduction time TSW of the CYCLE[n+2]. Thus, this approach enables the detection of a load current transient in the half-cycle SC in which the load current transient occurs, which correspond to the time when the load current Iload is at a maximum level. This fast detection of the load current transient through the comparator 1700 enables the prevention of current inversion in the half-cycle SC in which the load current transient is detected, namely in the CYCLE[n+2] in the example of FIGS. 17A-17F.

From the above description of the operation the comparator 1700 in relation to CYCLE[n], CYCLE[n+1] and CYCLE[n+2], it is seen that two situations arise in relation to the output signal COMP generated by the comparator. The first situation is that illustrated and described above for CYCLE[n] and CYCLE[n+1], namely where no load current transient occurs from one half-cycle to the next. In this situation, the comparator 1700 will activate the COMP signal within the certain percentage of the conduction time TSW, namely within β·TSW. When this occurs, no action is necessary to prevent current inversion of the current $I_{SR1}$, $I_{SR2}$ through the synchronous rectification transistors SR1, SR2 and these transistors can continue being controlled through the adaptive turn-off control algorithm or any other suitable turn-off control algorithm for controlling the synchronous rectifier transistors in the rectifier 5 of FIG. 6.

The second situation that arises is that illustrated and described above for CYCLE[n+2], namely where a load current transient results in a reduction in a high load current Iload, such as a maximum or full load current to zero load current transient. In this situation, the comparator 1700 will not activate the COMP signal within the certain percentage of the conduction time TSW, namely within β·TSW. Where the adaptive turn-off control algorithm is being used to control the transistors SR1, SR2, the detection of a load current transient as indicated by the COMP signal (i.e., COMP signal is not activated within time limit f3. TSW of the conduction time TSW), the programmable delay PD, which is also indicated as delay $T_{DEL\_OFF}$ in FIGS. 16B and 16C, is reset to zero. This zero delay will result in the transistors SR being turned OFF in response to the earlier zero-crossing of the voltage signal Vdvs as previously discussed above in relation to FIGS. 11A, 11B, for example. This turn OFF of the transistors may not result in the ideal conduction time $T_{diode\text{-}ideal}$ of the body diode Dbr of the transistors SR, but this will avoid current inversion. Moreover, the adaptive turn-off control algorithm will, after the programmable delay PD is reset to zero in response to the COMP signal indicating a load current transient, operate as described above in relation to FIGS. 11A and 11B to once again adjust the programmable delay over consecutive half-cycles SC until the actual conduction time $T_{diode}$ of the body diode Dbr is approximately equal to the ideal conduction time $T_{diode\text{-}ideal}$.

As mentioned several times in the above description, the current inversion prevention control algorithm described herein is not limited to being utilized in conjunction with the adaptive turn-off control algorithm. Other control methods for controlling the turning OFF of the synchronous rectification transistors SR in a rectification circuit, such as rectifier 5 in FIG. 6, may be utilized in combination with the current inversion prevention control algorithm. In another embodiment, the detection of a load current transient as indicated by the COMP signal is used by control circuitry, such as the control circuit 7 in FIG. 6, to place the switching converter 100 (FIG. 6) in a "safe state" for turn OFF of the transistors SR1, SR2 to thereby avoid current inversion.

Figure 18:
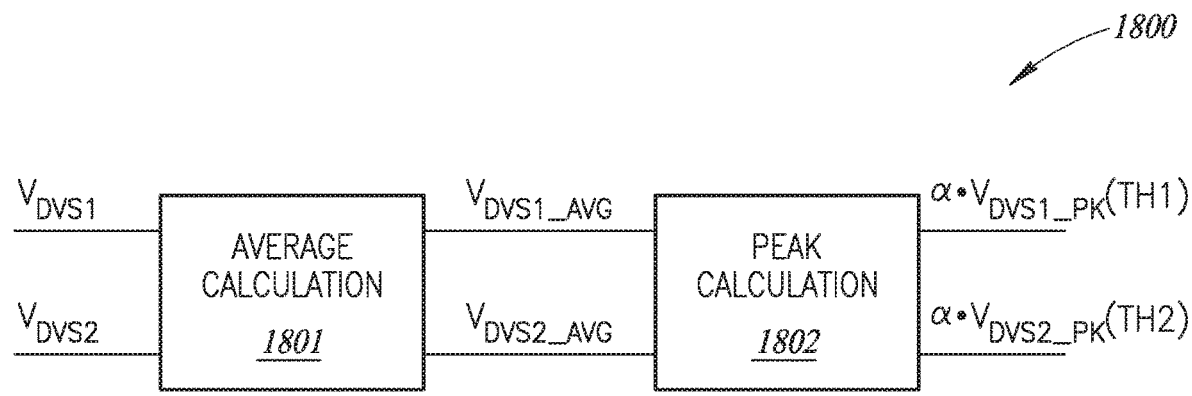
FIG. 18 is a functional block diagram illustrating a threshold calculation circuit of the current inversion prevention control algorithm according to one embodiment of the present disclosure.

FIG. 18 is a functional block diagram illustrating a threshold calculation circuit 1800 of the current inversion prevention control algorithm for generating the threshold TH according to one embodiment of the present disclosure. In this embodiment, an average calculation circuit 1801 senses the voltage signals $V_{DVS1}$, $V_{DVS2}$ of the transistors SR1, SR2 from the previous N half-cycles SC of the switching converter 100. More specifically, the average calculation circuit 1801 senses the voltage signals $V_{DVS1}$, $V_{DVS2}$ during the conduction times TSW of each of the transistors SR1, SR2 over the previous N half-cycles SC, and calculates an average voltage signal $V_{DVS1\_AVG}$, $V_{DVS2\_AVG}$ for each of these sensed voltage signals. Thus, the average calculation circuit 1801 generates the average voltage signal $V_{DVS1\_AVG}$ indicating the average of the voltage signal $V_{DVS1}$ over the prior N half-cycles SC, and also generates the average voltage signal $V_{DVS2\_AVG}$ indicating the average of the voltage signal $V_{DVS2}$ over the prior N half-cycles SC.

A peak calculation circuit 1802 receives the average voltage signals $V_{DVS1\_AVG}$ and $V_{DVS2\_AVG}$ and generates therefrom the threshold TH, which includes a separate peak voltage reference threshold for each of the transistors SR1, SR2 as previously mentioned. Thus, the peak voltage reference threshold TH includes a first peak voltage reference threshold $TH1=(\alpha \cdot V_{DVS1\_PK})$ and a second peak voltage reference threshold $TH2=(\alpha \cdot V_{DVS2\_PK})$ for use by the comparator 1700 in sensing the voltage signals $V_{DVS1}$ and $V_{DVS2}$. Accordingly, although not shown in FIG. 17F, the comparator 1700 compares the voltage signal $V_{DVS1}$ to the first peak voltage reference threshold $TH1=(\alpha \cdot V_{DVS1\_PK})$ and compares the voltage signal $V_{DVS2}$ to the second peak voltage reference threshold $TH2=(\alpha \cdot V_{DVS2\_PK})$ for use by the comparator 1700 in sensing the voltage signals $V_{DVS1}$ and $V_{DVS2}$.

Figure 19:
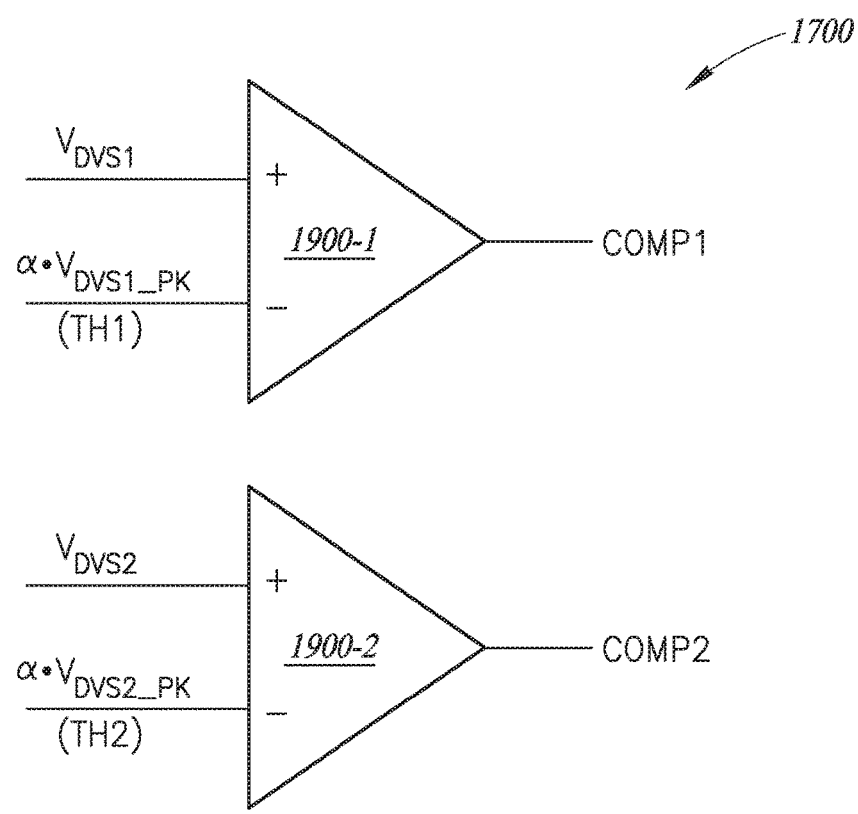
FIG. 19 is a functional block diagram one embodiment of the comparator of FIG. 17 according to one embodiment of the present disclosure.

FIG. 19 is a functional block diagram of one embodiment of the comparator 1700 of FIG. 17. In the embodiment of FIG. 19, the comparator 1700 includes a first comparator circuit 1900-1 that receives the first peak voltage reference threshold $TH1=(\alpha \cdot V_{DVS1\_PK})$ and the voltage signal $V_{DVS1}$ of the transistor SR1 and generates a first comparison output signal COMP1 based on a comparison of the two received signals. The comparator 1700 includes a second comparator circuit 1900-2 that receives the second peak voltage reference threshold $TH2=(\alpha \cdot V_{DVS2\_PK})$ and the voltage signal $V_{DVS2}$ of the transistor SR2 and generates a second comparison output signal COMP2 based on a comparison of the two received signals. Thus, the first comparator circuit 1900-1 generates the COMP1 signal to indicate whether a load current transient has been detected in relation to switching of the transistor SR1 and the second comparator circuit 1900-2 generates the COMP2 signal to indicate whether a load current transient has been detected in relation to switching of the transistor SR1. The comparator 1700 of FIGS. 17 and 19 and the threshold calculation circuit 1800 of FIG. 18 are part of the control circuit 7 of FIG. 6 and may be implemented through suitable circuitry including hardware, software, firmware, or a combination thereof, as will be appreciated by those skilled in the art.

The above-described embodiments of the present disclosure are described in the context of a resonant switching converter including synchronous rectification circuitry including first and second synchronous rectifier transistors that are MOSFETs. Embodiments of present disclosure are not limited to this particular type of switching converter, synchronous rectification circuitry, or type of synchronous rectifier transistor. In other embodiments of the present disclosure, the synchronous rectification circuitry includes at least one synchronous rectifier transistor. Moreover, the synchronous rectifier transistors are bipolar transistors or insulated gate bipolar junction transistors in other embodiments of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of controlling synchronous rectification transistors in a switching converter, the method comprising:
   sensing a drain-to-source voltage across each synchronous rectification transistor each switching half-cycle of the switching converter; and
   calculating an average of the sensed drain-to-source voltage for each synchronous rectification transistor over N prior switching half-cycles, wherein N is an integer greater than 0.

2. The method of claim 1, comprising:
   detecting a load current transient in the switching converter based on the sensed drain-to-source voltage of each synchronous rectification transistor and the calculated average of the sensed drain-to-source voltage for each synchronous rectification transistor over the N prior switching half-cycles, the detecting a load current transient including:
      calculating a peak voltage reference threshold for each synchronous rectification transistor having a value based on the calculated average of the sensed drain-to-source voltage for the synchronous rectification transistor; and
      comparing the sensed drain-to-source voltage of each synchronous rectification transistor to the corresponding peak voltage reference threshold for the synchronous rectification transistor.

3. The method of claim 2, wherein calculating the peak voltage reference threshold for each synchronous rectification transistor comprises:
   calculating a peak sensed drain-to-source voltage from the calculated average of the sensed drain-to-source voltage for the synchronous rectification transistor; and
   multiplying the peak sensed drain-to-source voltage by a threshold adjustment factor to generate the peak voltage reference threshold.

4. The method of claim 2, wherein detecting the load current transient further comprises, for each synchronous rectification transistor:
   comparing the sensed drain-to-source voltage to the peak voltage reference threshold during a conduction time of the synchronous rectification transistor;
   determining whether the sensed drain-to-source voltage reaches the peak voltage reference threshold within a certain percentage of the conduction time; and
   detecting the load current transient in response to the sensed drain-to-source voltage not reaching the peak voltage reference threshold within the certain percentage of the conduction time.

5. The method of claim 4, further comprising multiplying the conduction time by a conduction time adjustment factor to determine the certain percentage of the conduction time.

6. The method of claim 5, wherein calculating of the average of the sensed drain-to-source voltage for each synchronous rectification transistor over N prior switching half-cycles comprises calculating the average of the sensed drain-to-source voltage during the conduction time of the synchronous rectification transistor.

7. The method of claim 1, further comprising controlling the switching converter through an adaptive turn-off control algorithm.

8. The method of claim 7, wherein the adaptive turn-off control algorithm generates a programmable delay that is utilized in controlling each synchronous rectification transistor, and wherein the method further comprises resetting the programmable delay to zero in response to detecting a load current transient in the switching converter.

9. The method of claim 1, wherein the switching half-cycle of each synchronous rectification transistor begins in response to the sensed drain-to-source voltage of the synchronous rectification transistor reaching a first threshold value and ends in response to the drain-to-source voltage reaching a second threshold value.

10. The method of claim 9, wherein the first threshold value is less than the second threshold value.

11. A control circuit configured to be coupled to synchronous rectification circuitry of a switching converter, the control circuit configured to generate control signals to control switching of at least one synchronous rectifier transistor in the synchronous rectification circuitry, each at least one synchronous rectifier transistor including a control node and signal nodes, and the control circuit configured to sense a voltage across the signals nodes of each at least one synchronous rectifier transistor for a portion of each switching cycle of the switching converter in which the at least one synchronous rectifier transistor is activated, and the control circuit configured to determine for each at least one synchronous rectifier transistor, over N prior portions of switching cycles in which the at least one synchronous rectifier transistor is activated, N being an integer greater than 0, an average of the sensed voltage across the signal nodes of the at least one synchronous rectifier transistor.

12. The control circuit of claim 11, wherein the control circuit is configured to generate first and second control signals to control switching of first and second synchronous rectifier transistors, respectively, and wherein the portion of the switching cycle of the switching converter includes a first switching half-cycle in which the first synchronous rectifier transistor is activated and a second switching half-cycle in which the second synchronous rectifier transistor is activated.

13. The control circuit of claim 12, wherein the control circuit comprises:
   an average calculation circuit coupled to at least one of the signal nodes of each of the first and second synchronous rectifier transistors, the average calculation circuit configured to sense the voltage across the signals nodes of the first and second synchronous rectifier transistors during a conduction time of the first and second synchronous rectifier transistors, and configured to calculate a corresponding first and second average voltage of the sensed voltage over the N prior first and second switching half-cycles for the first and second synchronous rectifier transistors, respectively; and
   a peak calculation circuit coupled to the average calculation circuit to receive the calculated first and second average voltages, and the peak calculation circuit configured to generate first and second peak voltage reference thresholds based on the calculated first and second average voltages, respectively.

14. The control circuit of claim 13, wherein the peak calculation circuit is coupled to multiply the first and second calculated average voltages by a threshold adjustment factor to generate the first and second peak reference voltage thresholds.

15. The control circuit of claim 14, wherein the control circuit further comprises first and second comparators, the first and second comparators each including a first input coupled to one of the signal nodes of the first and second synchronous rectifier transistors, respectively, and the first and second comparators each including a second input coupled to receive the peak voltage reference threshold generated for the first synchronous rectifier transistor and the second synchronous rectifier transistor, respectively, and wherein the first and second comparators are configured to generate first and second comparison output signals, respectively, each of the first and second comparison output signals indicating whether a load transient has occurred in a current first switching half-cycle and second switching half-cycle, respectively.

16. A switching converter, comprising:
switching circuitry including at least one switching element;
synchronous rectification circuitry coupled to the switching circuitry, the synchronous rectification circuitry including at least one synchronous rectifier transistor, each at least one synchronous rectifier transistor including a control node and signal nodes; and
a control circuit coupled to each at least one synchronous rectifier transistor, the control circuit configured to:
sense a voltage across the signals nodes of each at least one synchronous rectifier transistor during each portion of switching cycle of the switching converter in which the at least one synchronous rectifier transistor is activated; and
calculate an average of the sensed voltage for each at least one synchronous rectifier transistor over N prior portions of the switching cycle in which the at least one synchronous rectifier transistor is activated, wherein N is an integer greater than 0.

17. The control circuit of claim 16, wherein the control circuit is configured to detect a load current transient in the switching converter based on a comparison of the sensed voltage of each at least one synchronous rectifier transistor during the portion of the switching cycle in which the at least one synchronous rectifier is activated and the calculated average of the sensed voltage for the at least one synchronous rectifier transistor over the N prior portions of the switching cycle in which the at least one synchronous rectifier transistor is activated.

18. The control circuit of claim 16, wherein each at least one synchronous rectifier transistor comprises a MOSFET, and the synchronous rectification circuitry includes first and second MOSFETs.

19. The control circuit of claim 16, wherein the control circuit is further configured to implement an adaptive turn-off control algorithm to control the switching of the first and second MOSFETs.

20. The control circuit of claim 16, wherein the switching circuitry comprises LLC resonant converter circuitry.

* * * * *